(12) United States Patent
Fukuda et al.

(10) Patent No.: US 12,454,024 B2
(45) Date of Patent: Oct. 28, 2025

(54) JOINING METHOD AND JOINED BODY

(71) Applicant: KAWASAKI JUKOGYO KABUSHIKI KAISHA, Kobe (JP)

(72) Inventors: Takuya Fukuda, Kobe (JP); Naoki Takeoka, Kobe (JP); Ryoji Ohashi, Kobe (JP); Shuhei Yoshikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 30 days.

(21) Appl. No.: 18/288,445

(22) PCT Filed: May 11, 2022

(86) PCT No.: PCT/JP2022/019908
§ 371 (c)(1),
(2) Date: Oct. 26, 2023

(87) PCT Pub. No.: WO2022/239795
PCT Pub. Date: Nov. 17, 2022

(65) Prior Publication Data
US 2024/0207968 A1 Jun. 27, 2024

(30) Foreign Application Priority Data
May 14, 2021 (JP) ................................. 2021-082331

(51) Int. Cl.
*B23K 20/00* (2006.01)
*B23K 20/12* (2006.01)
(Continued)

(52) U.S. Cl.
CPC ........ *B23K 20/1265* (2013.01); *B23K 20/123* (2013.01); *B23K 20/126* (2013.01);
(Continued)

(58) Field of Classification Search
CPC .............. B23K 20/126; B23K 20/1265; B23K 20/122; B23K 20/1245; B23K 20/123;
(Continued)

(56) References Cited

U.S. PATENT DOCUMENTS 4,940,847 A * 7/1990 Gramberger .......... F16D 23/025
192/107 M
7,416,102 B1 * 8/2008 Trapp ................. B23K 20/1255
228/2.1
(Continued)

FOREIGN PATENT DOCUMENTS

| JP | 2007-098439 A | 4/2007 |
| JP | 2017-070963 A | 4/2017 |
| WO | 2004/018141 A1 | 3/2004 |

OTHER PUBLICATIONS

Instructables (Welding Joints and Beyond, https://www.instructables.com/Welding-Joints/ using wayback machine, Apr. 15, 2021) (Year: 2021).*

(Continued)

*Primary Examiner* — Erin B Saad
(74) *Attorney, Agent, or Firm* — Oliff PLC

(57) ABSTRACT

A welding method for welding an overlapping part of a first member and a second member includes: a first welding step of forming a friction-stirred part at a one-end-side spot being a spot that is closest to one end of the overlapping part by plunging a rotary tool into the one-end-side spot; a second welding step of forming a friction-stirred part at an other-end-side spot that is located away from the one-end-side spot and closer to the other end by plunging the rotary tool into the other-end-side spot; and a third welding step of forming a friction-stirred part at an intermediate spot located between the one-end-side spot and the other-end-side spot by plunging the rotary tool into the intermediate spot.

5 Claims, 19 Drawing Sheets

(51) Int. Cl.
*B23K 103/04* (2006.01)
*B23K 103/08* (2006.01)
*B23K 103/12* (2006.01)
*B23K 103/20* (2006.01)
*B23K 103/24* (2006.01)

(52) U.S. Cl.
CPC ...... *B23K 2103/05* (2018.08); *B23K 2103/12* (2018.08); *B23K 2103/15* (2018.08); *B23K 2103/20* (2018.08); *B23K 2103/24* (2018.08)

(58) Field of Classification Search
CPC .... B23K 20/1255; B23K 20/125; B23K 11/11
See application file for complete search history.

(56) References Cited

U.S. PATENT DOCUMENTS

| | | | | | |
|---|---|---|---|---|---|
| 8,534,530 | B2* | 9/2013 | Biggs | ............... | B23Q 3/08 228/2.1 |
| 8,783,078 | B2* | 7/2014 | Ren | ............... | B21D 5/01 72/126 |
| 9,868,176 | B2* | 1/2018 | Chiashi | ............... | B23K 35/3053 |
| 2002/0050508 | A1* | 5/2002 | Yoshinaga | ............... | B23Q 1/5431 228/2.1 |
| 2005/0001010 | A1 | 1/2005 | Koga et al. | | |
| 2005/0035179 | A1* | 2/2005 | Forrest | ............... | B21D 22/16 228/112.1 |
| 2006/0062964 | A1* | 3/2006 | Ikuyama | ............... | B64C 3/26 428/137 |
| 2006/0169740 | A1* | 8/2006 | Fukuhara | ............... | B23K 20/1265 228/2.1 |
| 2006/0169741 | A1* | 8/2006 | Smith | ............... | B23K 20/126 228/2.1 |
| 2006/0191979 | A1* | 8/2006 | Lohwasser | ............... | B23K 20/126 228/112.1 |
| 2006/0255094 | A1* | 11/2006 | Taylor | ............... | B23K 20/1265 228/101 |
| 2007/0187469 | A1* | 8/2007 | Chen | ............... | B32B 7/12 228/112.1 |
| 2008/0296350 | A1* | 12/2008 | Henneboehle | ..... | B23K 20/1245 228/2.1 |
| 2009/0068492 | A1* | 3/2009 | Fujii | ............... | B23K 20/128 428/615 |
| 2009/0148719 | A1* | 6/2009 | Bergstrom | ............ | B23K 20/122 228/2.1 |
| 2009/0152328 | A1* | 6/2009 | Okamoto | ............ | B23K 20/128 228/2.1 |
| 2010/0089976 | A1* | 4/2010 | Szymanski | .......... | B23K 20/126 228/113 |
| 2010/0089977 | A1* | 4/2010 | Chen | ................ | B23K 20/2333 228/114.5 |
| 2013/0219981 | A1* | 8/2013 | Radtke | ............... | B21D 22/185 72/379.2 |
| 2015/0050516 | A1* | 2/2015 | Anast | ............... | B32B 7/04 228/49.4 |
| 2016/0167158 | A1* | 6/2016 | Spinella | ............ | B23K 35/0288 403/270 |
| 2017/0095876 | A1 | 4/2017 | Mizobata et al. | | |
| 2019/0143442 | A1* | 5/2019 | Ohashi | ................ | B23K 11/16 428/172 |
| 2020/0016686 | A1* | 1/2020 | Werz | ................. | B23K 20/1265 |
| 2021/0031296 | A1* | 2/2021 | Wu | ................. | B23K 37/0538 |
| 2021/0061367 | A1* | 3/2021 | Hahnlen | .............. | B21D 22/02 |
| 2021/0086293 | A1* | 3/2021 | Odakura | ............. | B23K 20/126 |
| 2025/0007035 | A1* | 1/2025 | Yamashita | ............ | F28D 9/005 |

OTHER PUBLICATIONS

Jun. 21, 2022 International Search Report issued in International Patent Application No. PCT/JP2022/019908.

* cited by examiner

| FIRST MEMBER (UPPER PLATE) | SECOND MEMBER (LOWER PLATE) |
|---|---|
| ALUMINUM | ALUMINUM |
|  | CARBON STEEL |
|  | STAINLESS |
|  | COPPER |
|  | TITANIUM |
| MAGNESIUM | MAGNESIUM |
|  | ALUMINUM |
|  | CARBON STEEL |
|  | STAINLESS |
|  | COPPER |
|  | TITANIUM |
| CARBON STEEL | CARBON STEEL |
|  | TITANIUM |
| METAL | THERMOPLASTIC RESIN |
| THERMOPLASTIC RESIN | THERMOPLASTIC RESIN |

|  | OPPOSITE-END-SPOTS | INTERMEDIATE SPOT |
|---|---|---|
| TOOL DIAMETER | SMALL | LARGE |
| ROTATIONAL SPEED | LOW | HIGH |
| PRESSURIZING FORCE | SMALL | LARGE |
| WELDING TIME PERIOD | SHORT | LONG |
| EXTERNAL COOLING AMOUNT | LARGE | SMALL |

JOINING METHOD AND JOINED BODY

TECHNICAL FIELD

The present disclosure relates to a technology of welding members by friction stir.

BACKGROUND ART

Patent Literature 1 described below shows a conventional way of plunging a rotary tool into spots (to be spot welds) at an overlapping part of two plate members (metal plates) overlapping each other, and welding the plate members via friction-stirred parts formed by the plunging.

In Patent Literature 1, the plate member located closer to the rotary tool is defined as an upper plate, and the plate member located opposite to the rotary tool is defined as a lower plate. The rotary tool is plunged from a surface of the upper plate to pass through at least the upper plate. Thus, a temperature rise in the plunging of the rotary tool is higher in the upper plate than in the lower plate. The higher temperature of the upper plate than the temperature of the lower plate means that a deformation amount (thermal expansion amount) attributed to thermal expansion, and a deformation amount (thermal shrinkage amount) attributed to thermal shrinkage accompanied by subsequent cooling are likely to be larger in the upper plate. When the thermal shrinkage amount of the upper plate becomes larger than the thermal shrinkage amount of the lower plate, a welded assembly including the upper plate and the lower plate in combination warps and deforms to curve into a bow shape protruding downward.

In particular, Patent Literature 1 performs friction stir welding to spots arrayed in a row at the overlapping part of the upper plate and the lower plate. Thus, repetitive warpage deformation attributed to the aforementioned difference between thermal shrinkage amounts may significantly increase a warpage quantity of the welded assembly.

CITATION LIST

Patent Literature

Patent Literature 1: Japanese Unexamined Patent Publication No. 2007-98439

SUMMARY OF INVENTION

The present disclosure has been achieved in consideration of the circumstances described above, and has an object of suppressing warpage deformation of a welded assembly obtained by friction stir welding spots.

To solve the drawbacks described above, a welding method according to one aspect of this disclosure is a welding method for welding a first member and a second member at an overlapping part of the first member and the second member by plunging a rotary tool into spots located between one end and the other end of the overlapping part to form friction-stirred parts. The welding method includes: a first welding step of forming the friction-stirred part at a one-end-side spot being a spot that is closest to the one end of the overlapping part by plunging the rotary tool into the one end-side spot from the first member; a second welding step of forming the friction-stirred part at an other-end-side spot that is located away from the one-end-side spot and closer to the other end by plunging the rotary tool into the other-end-side spot from the first member after the first welding step; and a third welding step of forming the friction-stirred part at an intermediate spot located between the one-end-side spot and the other-end-side spot by plunging the rotary tool into the intermediate spot from the first member after the second welding step.

A welded assembly according to another aspect of this disclosure includes: a first member; a second member overlapping the first member; a weld section formed by welding spots located between one end and the other end of an overlapping part of the first member and the second member by friction stir. An input heat amount to a one-end-side spot being a spot that is closest to the one end of the overlapping part and an input heat amount to an other-end-side spot that is located away from the one-end-side spot and closer to the other end are smaller than an input heat amount to an intermediate spot located between the one-end-side spot and the other-end-side spot.

This disclosure achieves suppression of warpage deformation of a welded assembly obtained by friction stir welding spots.

DESCRIPTION OF EMBODIMENTS

(1) First Embodiment

Figure 1:
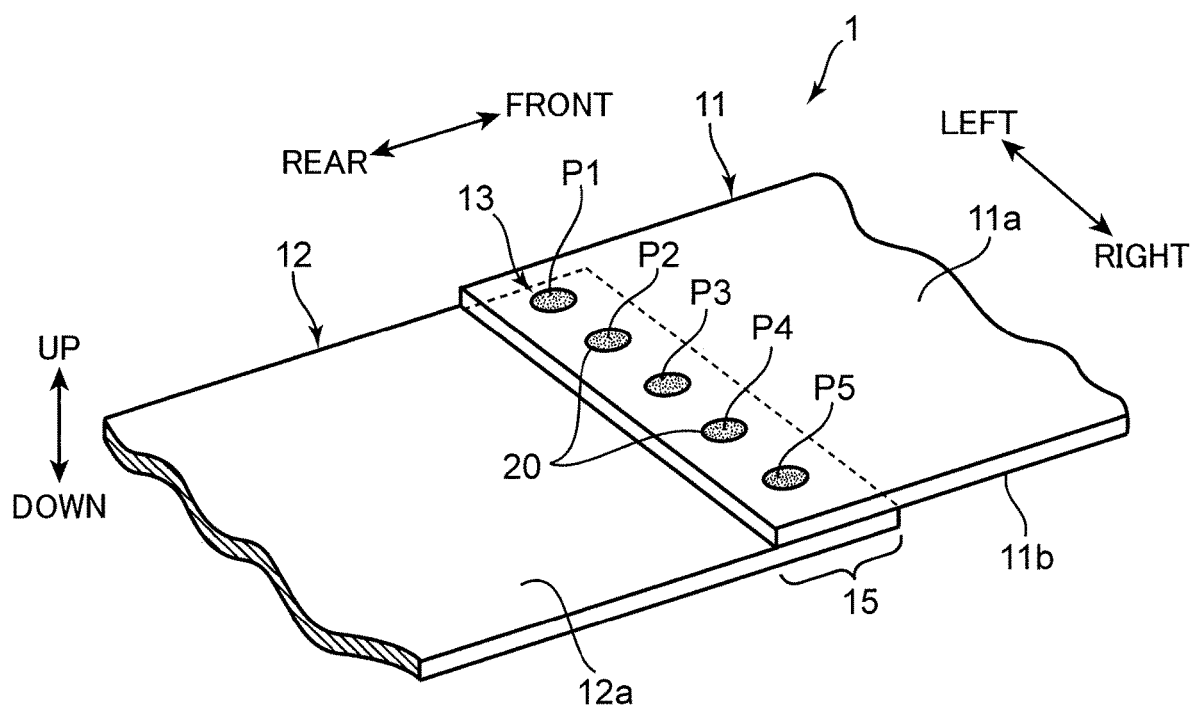
FIG. 1 is a perspective view of a configuration of a welded assembly manufactured by a welding method according to a first embodiment of the present disclosure.
Figure 2:
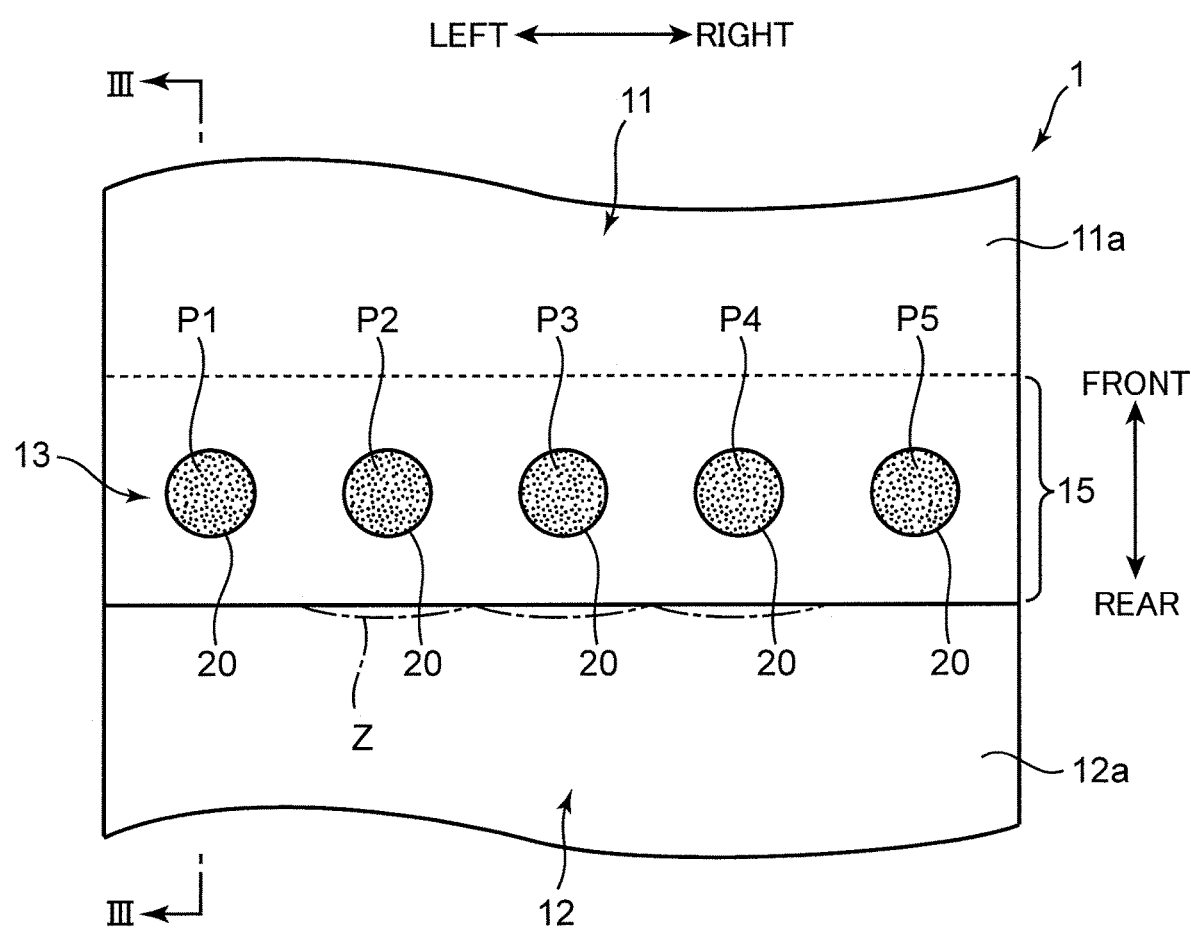
FIG. 2 is a plan view of the welded assembly.

Hereinafter, a first embodiment of this disclosure will be described with reference to the accompanying drawings.
Welded Assembly FIG. 1 and FIG. 2 are respectively a perspective view and a plan view of a configuration of a welded assembly 1 manufactured by a welding method according to the first embodiment of this disclosure. As illustrated in the drawings, the welded assembly 1 includes a first member 11, a second member 12, and a welded section 13 welding the members 11, 12 to each other. The welded assembly 1 is applicable to a structure, e.g., an aircraft, a railway vehicle, or an automobile. Hereinafter, front, rear, left, right, up, and down directions concerning the welded assembly 1 are defined as shown in the drawings. This is for convenience of description and is not intended to limit a posture of the welded assembly 1.

Each of the first member 11 and the second member 12 has a planar shape with a uniform thickness in an up-down direction. A rear end of the first member 11 and a front end of the second member 12 overlap each other in the up-down direction (thickness direction) to form an overlapping part 15 having a strip shape which is long in a left-right direction. At the overlapping part 15, the first member 11 and the second member 12 are stacked so that the first member 11 lies on the second member 12. Specifically, at the overlapping part 15, a front end of an upper surface 12a of the second member 12 and a rear end of a lower surface 11b of the first member 11 are in contact with each other.

The welded section 13 is formed at the overlapping part 15 to weld the rear end of the first member 11 and the front end of the second member 12 to each other at the overlapping part 15. The welded section 13 includes friction-stirred parts 20 independently arrayed in the left-right direction. The number of friction-stirred parts is five in the embodiment. Each friction-stirred part 20 results in a spot weld formed through a friction stirring process using a friction stir welding device M to be described later.

The friction-stirred parts 20 are formed respectively at five spots P1 to P5 located at the overlapping part 15. Hereinafter, the spots are defined as a first spot P1, a second spot P2, . . . and a fifth spot P5 sequentially from a left end to a right end of the overlapping part 15. Specifically, the first spot P1 is located at a leftmost position at the overlapping part 15, the second spot P2 is adjacent to the right of the first spot P1, the third spot P3 is adjacent to the right of the second spot P2, the fourth spot P4 is adjacent to the right of the third spot P3, and the fifth spot P5 is adjacent to the right of the fourth spot P4 and is located at a rightmost position at the overlapping part 15. The first to fifth spots P1 to P5 are arranged at equal intervals in the left-right direction at the overlapping part 15.

Figures 3, 4:
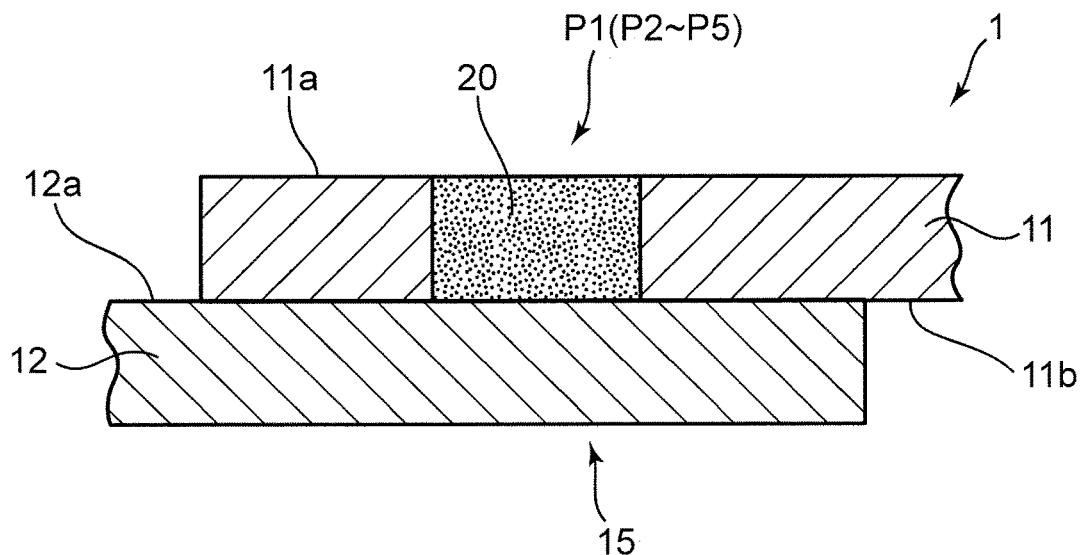
FIG. 3 is a cross-sectional view taken along the line III-III in FIG. 2.
FIG. 4 is a table showing example combinations of materials adoptable for a first member and a second member constituting the welded assembly.

FIG. 3 is a cross-sectional view of a configuration of the friction-stirred part 20 formed at each of the spots P1 to P5. As illustrated in the drawing, the friction-stirred part 20 at each of the spots P1 to P5 has a columnar shape with the substantially the same height as the thickness of the first member 11, in other words, has a columnar shape passing through the first member 11. A region of the friction-stirred part 20 having the columnar shape corresponds to a plunging region of a rotary tool 101, which will be described later, to be plunged from an upper surface 11a of the first member 11. In the plunging region, a material having been friction stirred is softened (with a plastic flow) and then solidified to form the friction-stirred part 20 having the columnar shape.

A material of the first member 11 and a material of the second member 12 are selected so that a linear expansion coefficient of the first member 11 is equal to or larger than a linear expansion coefficient of the second member 12. Various combinations of materials satisfying this relationship are considered, but an appropriate combination is selectable from, for example, metals including: an aluminum alloy; a magnesium alloy; stainless steel; carbon steel; a titanium alloy; and copper, and a thermoplastic resin. The thermoplastic resin may include a fiber reinforced resin resulting from a matrix resin made of thermoplastic resin and impregnated with reinforcing fibers.

FIG. 4 is a table showing preferable example combinations for the material of the first member 11 (upper plate) and the material of the second member 12 (lower plate). As shown in FIG. 4, when the material of the first member 11 is an aluminum alloy, the material of the second member 12 is selectable from an aluminum alloy, carbon steel, stainless steel, copper, and a titanium alloy. When the material of the first member 11 is a magnesium alloy, the material of the second member 12 is selectable from a magnesium alloy, an aluminum alloy, carbon steel, stainless steel, copper, and a titanium alloy. When the material of the first member 11 is carbon steel, the material of the second member 12 may be carbon steel or a titanium alloy. When the material of the first member 11 is a metal, the material of the second member 12 may be a thermoplastic resin (including a fiber reinforced resin). When the material of the first member 11 is a thermoplastic resin, the material of the second member 12 may be a thermoplastic resin.

As shown in FIG. 4, the material of the first member 11 may be the same as or different from the material of the second member 12. When the same material is adopted, the first member 11 and the second member 12 have the same linear expansion coefficient. When different materials are adopted, the linear expansion coefficient of the first member 11 is larger than the linear expansion coefficient of the second member 12. For instance, when the material of the first member 11 is an aluminum alloy, and the material of the second member 12 is any one of carbon steel, stainless steel, copper, and a titanium alloy, the linear expansion coefficient of the first member 11 is larger than the linear expansion coefficient of the second member 12. This is applicable to: a case where the material of the first member 11 is a magnesium alloy, and the material of the second member 12 is any one of an aluminum alloy, carbon steel, stainless steel, copper, and a titanium alloy; a case where the material of the first member 11 is carbon steel, and the material of the second member 12 is a titanium alloy; and a case where the material of the first member 11 is a metal, and the material of the second member 12 is a thermoplastic resin.

Friction Stir Welding Device

Figure 5:
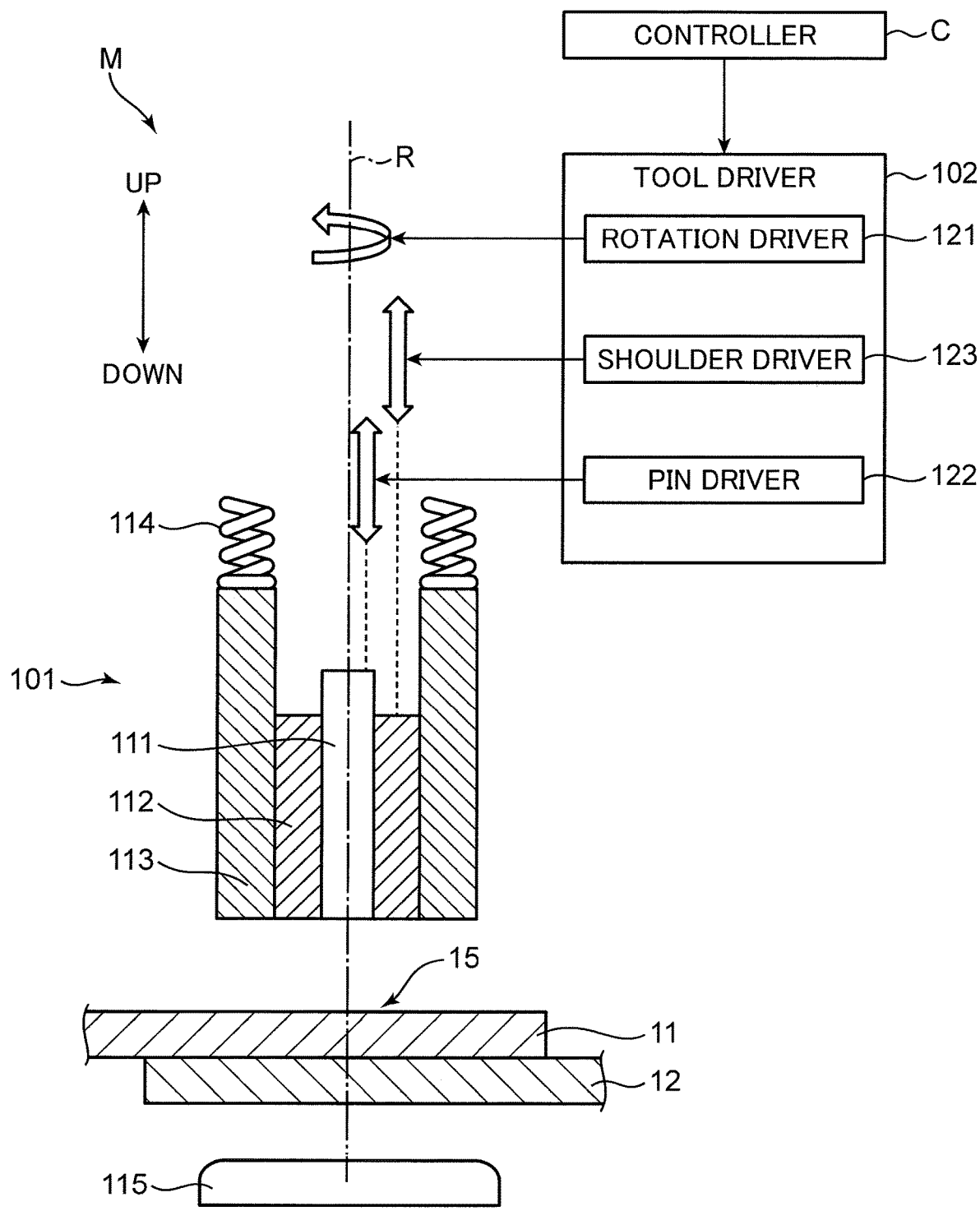
FIG. 5 is a system diagram showing an overall configuration of a friction stir welding device for use in manufacturing the welded assembly.

The welded assembly 1 is manufactured by using the friction stir welding device M illustrated in FIG. 5. As illustrated in the drawing, the friction stir welding device M includes: the double-acting rotary tool 101; a tool driver 102 that rotates, and raises and lowers the rotary tool 101; and a controller C that controls an operation of the tool driver 102. Although FIG. 5 indicates directions "up" and "down", the directions are for convenience of description and are not intended to limit a use posture of the rotary tool 101.

The rotary tool 101 is supported by an unillustrated tool fixing part. The tool fixing part can be, for example, a distal end of an articulated robot. A backing member 115 is disposed facing a lower end surface of the rotary tool 101. The first member 11 and the second member 12 to be welded to each other are arranged between the rotary tool 101 and the backing member 115.

The rotary tool 101 includes a pin member 111, a shoulder member 112, a clamp member 113, and a spring 114. The pin member 111 has a columnar shape, and is disposed with its axis extending in the up-down direction. The pin member 111 is rotatable about the axis as a rotation axis R, and can shift downward and upward (advance and retract) in the up-down direction along the rotation axis R.

The shoulder member 112 is located to surround an outer periphery of the pin member 111. Specifically, the shoulder member 112 includes a hollow part into which the pin member 111 is inserted, and has a cylindrical shape. The shoulder member 112 has an axis that is coaxial with the axis (the rotation axis R) of the pin member 111. The shoulder member 112 is rotatable about the rotation axis R of the pin member 111, and can shift downward and upward (advance and retract) in the up-down direction along the rotation axis R. In this manner, the shoulder member 112 and the pin member 111 inserted into the hollow part of the shoulder member 112 can shift relative to each other along the rotation axis R while rotating about the rotation axis R. That is to say, the pin member 111 and the shoulder member 112 are not only simultaneously shiftable upward and downward along the rotation axis R, but also independently shiftable such that one shifts downward and the other shifts upward.

The clamp member 113 is located to surround an outer periphery of the shoulder member 112. Specifically, the clamp member 113 includes a hollow part into which the shoulder member 112 is inserted, and has a cylindrical shape. The clamp member 113 has an axis that is also coaxial with the rotation axis R. The clamp member 113 does not rotate about the axis, but can shift downward and upward (advance and retract) in the up-down direction along the rotation axis R. The clamp member 113 serves to surround the outer periphery of the pin member 111 and the shoulder member 112 when the pin member 111 or the shoulder member 112 performs friction stir. The clamp member 113 surrounding the outer periphery enables a friction-stirred part to be finished smoothly without scattering friction stir materials.

The spring 114 is attached to an upper end of the clamp member 113 to press the clamp member 113 in a direction toward a welding target (downward). The clamp member 113 is attached to the tool fixing part via the spring 114 interposed therebetween.

The backing member 115 has an upper surface that serves as a support surface to come into contact with a lower surface of the welding target. Specifically, the backing member 115 supports the welding target when the pin member 111 or the shoulder member 112 is plunged into the welding target. The clamp member 113 pressed by the spring 114 presses the welding target against the backing member 115.

The tool driver 102 includes a rotation driver 121, a pin driver 122, and a shoulder driver 123. The rotation driver 121 includes a motor, a driving gear, and the like, and drives the pin member 111 and the shoulder member 112 rotatably about the rotation axis R. The pin driver 122 is a mechanism that causes the pin member 111 to advance and retract (shift downward and upward) along the rotation axis R. The pin driver 122 drives the pin member 111 so that the pin member 111 is plunged into the welding target and retracted from the welding target. The shoulder driver 123 is a mechanism that causes the shoulder member 112 to advance and retract along the rotation axis R, and to be plunged into and retract from the joining target of the shoulder member 112. The shoulder driver 123 causes the clamp member 113 to move toward the welding target together with the shoulder member 112, and presses the clamp member 113 against the backing member 115. At this time, a pressing force of the spring 114 acts.

The controller C includes a microcomputer, and controls an operation of each part of the tool driver 102 by executing a predetermined control program. Specifically, the controller C controls the rotation driver 121 to cause the pin member 111 and the shoulder member 112 to perform a required rotation operation. The controller C also controls the pin driver 122 and the shoulder driver 123 to cause the pin member 111, the shoulder member 112, and the clamp member 113 respectively to perform a required advancing or retracting operation.

The friction stir welding device M having the above-described configuration is typically used to weld two or more members by friction stir welding. The friction stir welding performed using the friction stir welding device M is mainly classified into a welding way adopting a shoulder-preceding process and a welding way adopting a pin-preceding process.

The welding way adopting the shoulder-preceding process includes precedingly plunging the shoulder member 112 of the rotary tool 101 into an overlapping part of the two or more members to perform friction stir there, and, at the same time, retracting the pin member 111 from the overlapping part. Then, the pin member 111 is lowered while the shoulder member 112 is retracted or raised to smooth an upper surface of the overlapping part. By contrast, the welding way adopting the pin-preceding process includes precedingly plunging the pin member 111 of the rotary tool 101 into the overlapping part to perform friction stir there, and, at the same time, retracting the shoulder member 112 from the overlapping part. Then, the shoulder member 112 is lowered while the pin member 111 is retracted or raised to smooth the upper surface of the overlapping part.

Welding Way

Figure 6:
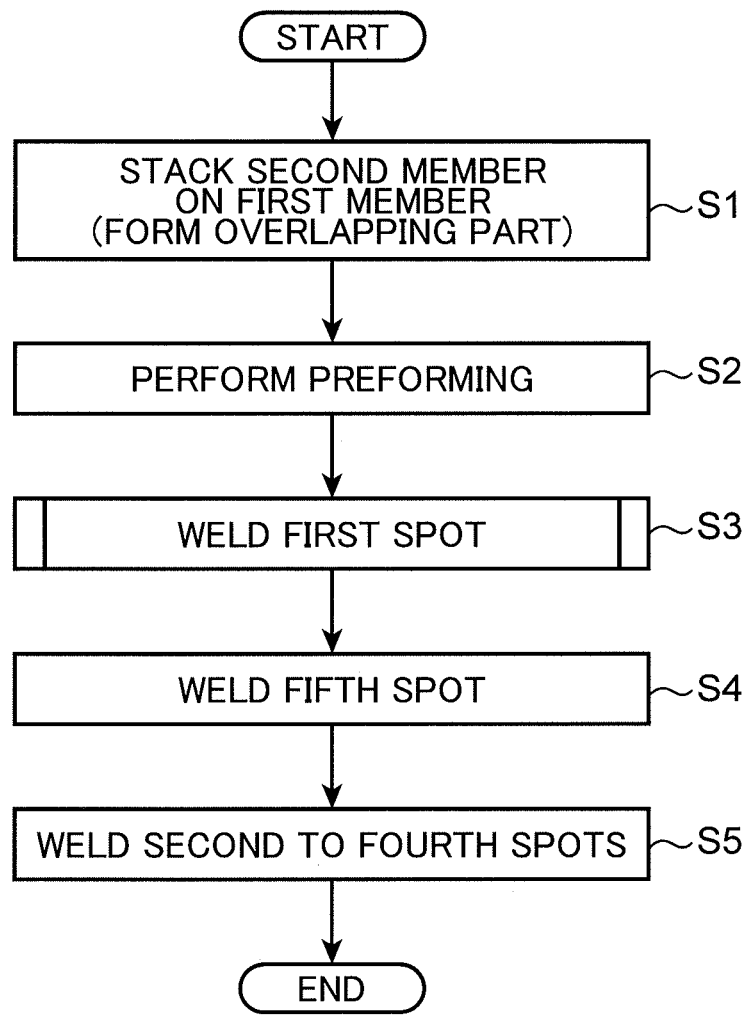
FIG. 6 is a flowchart showing a specific sequence of the welding method.

Next, a way of manufacturing the welded assembly 1 (FIG. 1 to FIG. 3) by using the friction stir welding device M (FIG. 5) will be described. The welded assembly 1 is manufactured through a sequence of steps S1 to S5 shown in FIG. 6.

Step S1 represents a stacking step of forming the overlapping part 15 by stacking the first member 11 on the second member 12. Specifically, in the stacking step S1, the overlapping part 15 including the first member 11 and the second member 12 overlapping from above in this order is formed by arranging the first member 11 and the second member 12 so that the front end of the second member 12 is stacked on the rear end of the first member 11.

Figure 7:
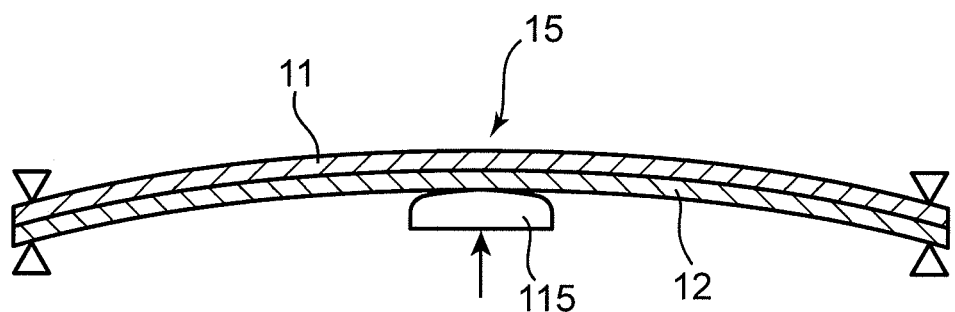
FIG. 7 is a schematic view for explaining contents of a preforming step executed in step S2 in FIG. 6.

Step S2 represents a preforming step of warping and deforming the first member 11 and the second member 12 overlapping each other at the overlapping part 15. Specifically, in the preforming step S2, as illustrated in FIG. 7, the left and right ends of the overlapping part 15 are fixed, and then, the backing member 115 is pressed against a center portion of the overlapping part 15 upward from below to curve (warp and deform) each of the first member 11 and the second member 12 into a bow shape protruding upward. This is a countermeasure against possible curving of each of the first member 11 and the second member 12 into a bow shape protruding downward due to friction stir welding in welding steps S3 to S5 to be described later. Specifically, the preforming step S2 is a countermeasure for a decrease in a warpage quantity of the first member 11 and the second member 12 after the welding, i.e., a warpage quantity of the welded assembly 1, by preliminarily warping and deforming the first member 11 and the second member 12 in a direction opposite to the direction in which warpage deformation is likely to occur in the subsequent friction stir welding (steps S3 to S5). Here, for better understanding, FIG. 7 exaggeratedly shows the warpage deformation in the preforming step S2 compared to a real warpage deformation.

Step S3 represents a welding step of friction-stir welding a first spot P1 by plunging the rotary tool 101 into the first spot P1. In other words, in the embodiment, a target to be firstly friction-stir welded is the first spot P1 located at the leftmost position at the overlapping part 15. In this case, the first spot P1 serves as a "one-end-side spot" in the present disclosure. Besides, the welding step S3 of welding the first spot P1 serves as a "first welding step" in the disclosure.

Specifically, in the welding step S3, a friction-stirred part 20 is formed at the first spot P1 by plunging the rotary tool 101 into a position of the first spot P1 at the overlapping part 15 from the first member 11, i.e., from above. The welding or friction stir welding using the rotary tool 101 includes the shoulder-preceding process and the pin-preceding process as already described above, and both the processes are adoptable for forming the friction-stirred part 20. In the embodiment, the shoulder-preceding process is adopted. In this case, the welding step S3 includes four sub-steps S31 to S34 shown in FIG. 8.

Sub-step S31 represents a positioning step of setting a position of the rotary tool 101 to the first spot P1 at the overlapping part 15. In the positioning step S31, the controller C (FIG. 5) controls the tool driver 102 to bring distal ends 111a to 113a respectively of the pin member 111, the shoulder member 112, and the clamp member 113 into contact with the upper surface 11a of the first member 11 after setting the rotation axis R (FIG. 5) of the rotary tool 101 to the position of the first spot P1 at the overlapping part 15 supported on the backing member 115.

Figure 8:
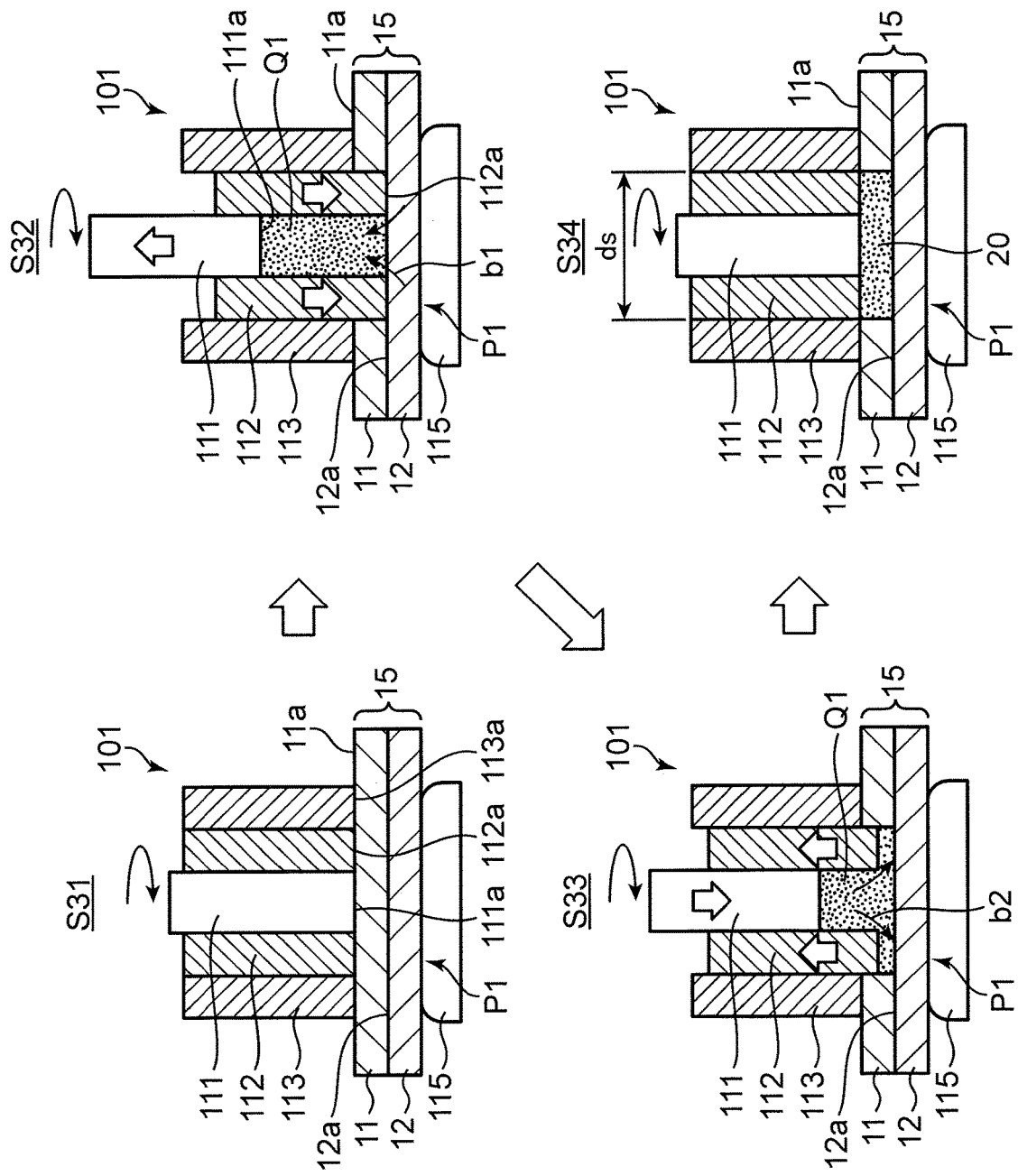
FIG. 8 is a schematic view for explaining contents of a welding step executed in step S3 in FIG. 6.

Sub-step S32 represents a plunging step of plunging the shoulder member 112. In the plunging step S32, the controller C controls the rotation driver 121 to rotate the pin member 111 and the shoulder member 112 at a high speed, and controls the shoulder driver 123 to lower the shoulder member 112 and plunge the shoulder member 112 into the first spot P1 at the overlapping part 15. The controller C controls the pin driver 122 to raise the pin member 111. This operation friction-stirs the overlapping part 15 to soften a material thereof and make a plastic flow of the material, and the softened material Q1 overflows out of a plunging region of the shoulder member 112. The softened material Q1 having overflowed is released into a hollow space in the shoulder member 112 that comes into existence by the rising (retraction) of the pin member 111 as denoted by an arrow b1. A plunging depth of the shoulder member 112 is set to a value at which the shoulder member 112 substantially passes through the first member 11 on an upper side. FIG. 8 exemplifies plunging of the shoulder member 112 passing through the first member 11 by just the thickness of the first member 11 in a thickness direction thereof. In this case, the friction-stirred part 20 to be formed after a leveling step S34 to be described later has such a columnar shape as to pass through the first member 11 in the thickness direction thereof and extend to reach the upper surface 12a of the second member 12 or a lower depth. Here, in reality, the friction-stirred part 20 slightly extends downward from the distal end 112a of the shoulder member 112, and thus, the shoulder member 112 is not necessarily required to thoroughly pass through the first member 11. Specifically, such a friction-stirred part 20 as to reach the upper surface 12a of the second member 12, in other words, such a friction-stirred part 20 as to pass through the first member 11 is acquirable even without plunging the shoulder member 112 into the first member 11 thoroughly.

Sub-step S33 represents a backfill step of performing backfilling with the softened material Q1 having overflowed. In the backfill step S33, the controller C controls the shoulder driver 123 and the pin driver 122 to raise (retract) the shoulder member 112 and lower the pin member 111 while rotating the pin member 111 and the shoulder member 112 at a high speed. This operation causes the softened material Q1 having been released into the hollow space to move to the region where the shoulder member 112 has been plunged, and backfilling with the material is performed in this manner as denoted by an arrow b2. The backfilling material forms the friction-stirred part 20 at the first spot P1 at the overlapping part 15 in cooperation with the material having left the hollow space (see the subsequent step S34). The friction-stirred part 20 includes the material having undergone the friction stir at the first spot P1, and has a columnar shape with an outer diameter substantially agreeing with the outer diameter ds of the shoulder member 112 and a height substantially corresponding to the plunging depth of the shoulder member 112.

Sub-step S34 represents a leveling step of leveling the friction-stirred part 20. In the leveling step S34, the controller C drives the rotation driver 121 to rotate the pin member 111 and the shoulder member 112 at a predetermined rotational speed in a state where the distal end 111a of the pin member 111 and the distal end 112a of the shoulder member 112 are restored to a height position of the upper surface 11a of the first member 11. This operation levels an upper surface of the friction-stirred part 20 and smooths the upper surface to an extent of almost no protrusions and recesses.

The friction-stirred part 20 having the smooth upper surface is formed at the first spot P1 at the overlapping part 15 through step S3 including sub-steps S31 to S34 described above. Specifically, forming of the friction-stirred part 20 at the first spot P1 results in welding the first member 11 and the second member 12 to each other at the first spot P1.

Referring back to FIG. 6, continuation of the way of manufacturing the welded assembly 1 will be described. After the welding of the first spot P1 by the above-described way (FIG. 8), the fifth spot P5 at an end opposite to the first spot P1 is welded in the subsequent welding step S4. In other words, in the embodiment, a target to be secondly friction-stir welded is the fifth spot P5 located at the rightmost position at the overlapping part 15. In this case, the fifth spot P5 serves as an "other-end-side spot" in the present disclosure. Besides, the welding step S4 of welding the fifth spot P5 serves as a "second welding step" in the disclosure.

The way of welding the fifth spot P5 through the welding step S4 is the same as the way (FIG. 8) of welding the first spot P1 through the welding step S3 described above. Specifically, in the welding step S4, a friction-stirred part 20 is formed at the fifth spot P5 by plunging the rotary tool 101 into a position of the fifth spot P5 at the overlapping part 15 from above.

After the welding of the fifth spot P5 in the aforementioned manner, the second to fourth spots P2 to P4 are sequentially welded. In other words, in the embodiment, targets to be thirdly friction-stir welded and thereafter are the second to fourth spots P2 to P4 located in an intermediate portion of the overlapping part 15. In this case, a specific one of the second to fourth spots P2 to P4 serves as an "intermediate spot" in the disclosure. Besides, the welding step S5 of welding the second to fourth spots P2 to P4 serves as a "third welding step" in the disclosure.

The way of welding the second to fourth spots P2 to P4 through the welding step S5 is also the same as the way (FIG. 8) of welding the first spot P1 through the welding step S3 described above. Specifically, in the welding step S5, a friction-stirred part 20 is formed at each of the second to fourth spots P2 to P4 by plunging the rotary tool 101 into a position of each of the second to fourth spots P2 to P4 at the overlapping part 15 from above.

In the welding step S5, the order of welding the second to fourth spots P2 to P4 is not particularly limited. For instance, the welding may be performed in the order of the second spot P2, the fourth spot P4, and the third spot P3, or in the order of the third spot P3, the second spot P2, and the fourth spot P4.

The friction-stirred parts 20 respectively formed at the spots P1 to P5 in the above-described manner establish a welded section 13 welding the first member 11 and the second member at the overlapping part 15. Specifically, the way based on steps S1 to S5 in FIG. 6 achieves manufacturing of the welded assembly 1 including the first member 11 and the second member 12 welded via the welded section 13.

Operational Effects

As described heretofore, in welding of the first member 11 and the second member 12 in the first embodiment of the disclosure, friction stir welding is performed to the five spots P1 to P5 arrayed at the overlapping part 15 of the first and second members 11 and 12 in the order of prioritizing the opposite ends, i.e., the spot P1 at the leftmost position and the spot P5 at the rightmost position, in the arraying direction. Specifically, the first spot P1 at the leftmost position and the spot P5 at the rightmost position are precedingly friction-stir welded, and thereafter, the second to fourth spots P2 to P4 located between the spots P1 and P5 are friction-stir welded. This configuration achieves suppression of warpage deformation of the welded assembly 1 resulting from the friction stir welding to the spots P1 to P5.

Figure 9A:
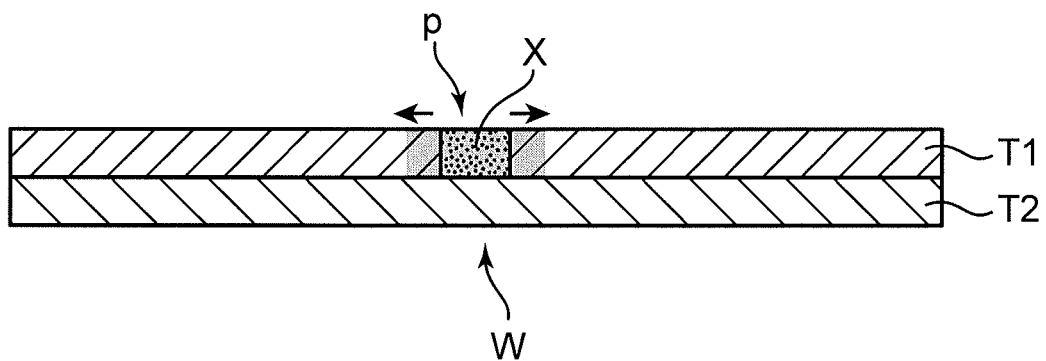
FIG. 9A is a cross-sectional view showing an occurrence of thermal expansion accompanied by friction stir welding.
Figure 9B:
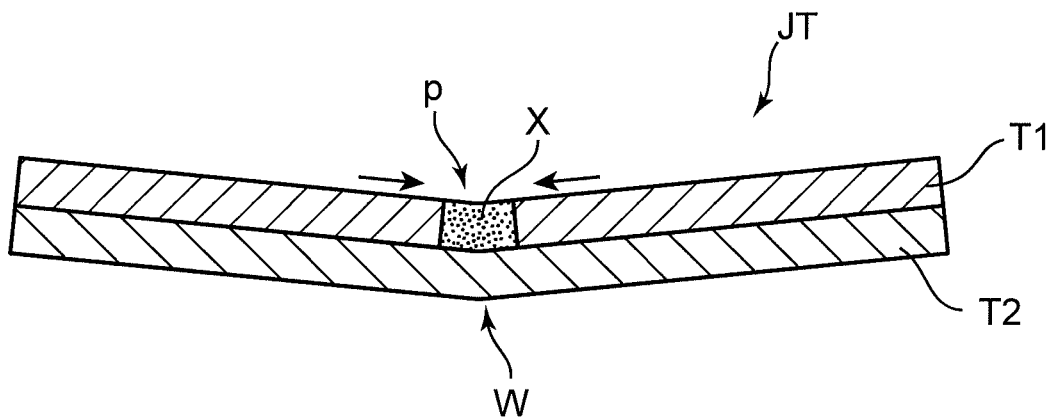
FIG. 9B is a cross-sectional view showing a state of warpage deformation of the welded assembly attributed to thermal shrinkage subsequent to the friction stir welding.

The reasons why the warpage deformation attributed to the friction stir welding occurs will be described for understanding of the operational effects. Each of FIGS. 9A and 9B is a schematic view explaining warpage deformation to occur in welding an upper plate T1 equivalent to the first member 11 in the embodiment and a lower plate T2 equivalent to the second member 12 in the embodiment by friction stir. FIG. 9A shows a presumed case of forming a friction-stirred part X by plunging the rotary tool 101 from above into a spot p at the center of an overlapping part W including the upper plate T1 and the lower plate T2 overlapping each other. When the rotary tool 101 is plunged into the spot p, a portion around the spot p in the upper plate T1 is heated, and a material having a higher temperature attributed to the heating deforms due to thermal expansion. FIG. 9A shows a colored region where the thermal expansion accompanied by the heating is likely to occur. By contrast, the lower plate T2 has a smaller temperature rise than the upper plate T1, and thus, the lower plate T2 has a smaller thermal expansion amount than the upper plate T1. This means that the upper plate T1 has a larger deformation amount (thermal shrinkage amount) than the lower plate T2, the deformation amount (thermal shrinkage amount) being accompanied by thermal shrinkage accompanied by cooling (temperature decrease) subsequent to the friction stir. Such a difference between thermal shrinkage amounts causes warpage deformation of a welded assembly JT including the upper plate T1 and the lower plate T2 in combination after the welding, as shown in FIG. 9B. Specifically, a residual stress of pulling the lower plate T2 to the center occurs, resulting in curving the welded assembly JT into a bow shape protruding downward.

It is said from these perspectives that the friction stir welding is a welding way which is likely to inherently cause warpage deformation of the welded assembly. In the embodiment, the overlapping part 15 of the first member 11 and the second member 12 has the spots P1 to P5 arrayed in one direction, and the friction stir welding is performed to each of the spots P1 to P5. Thus, repetitive warpage deformation attributed to the friction stir welding to each of the spots P1 to P5 is likely to increase a final warpage quantity of an entirety of the welded assembly 1. In particular, when the first member 11 (upper plate) and the second member 12 (lower plate) are made of materials different from each other in combination so that a linear expansion coefficient of the first member 11 is larger than a leaner expansion coefficient of the second member 12, the difference between thermal shrinkage amounts discussed above is likely to be larger, and the warpage deformation is likely to be apparent.

However, in the embodiment, the friction stir welding is precedingly performed to the first spot P1 and the fifth spot P5 at the opposite ends in the spot arraying direction (left-right direction), in other words, the friction stir welding is subsequently performed to the second to fourth intermediate spots P2 to P4 at a later stage. This leads to suppressing the aforementioned increase in the warpage quantity. The reasons will be described below with reference to FIG. 10A to FIG. 11C.

Figure 10A:
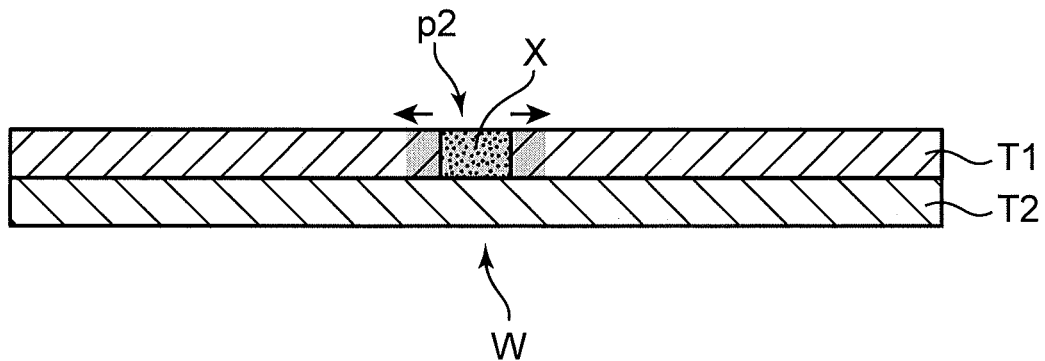
FIG. 10A is a cross-sectional view showing friction stir welding to be executed in a first sequence of preceding welding from the center.
Figure 10B:
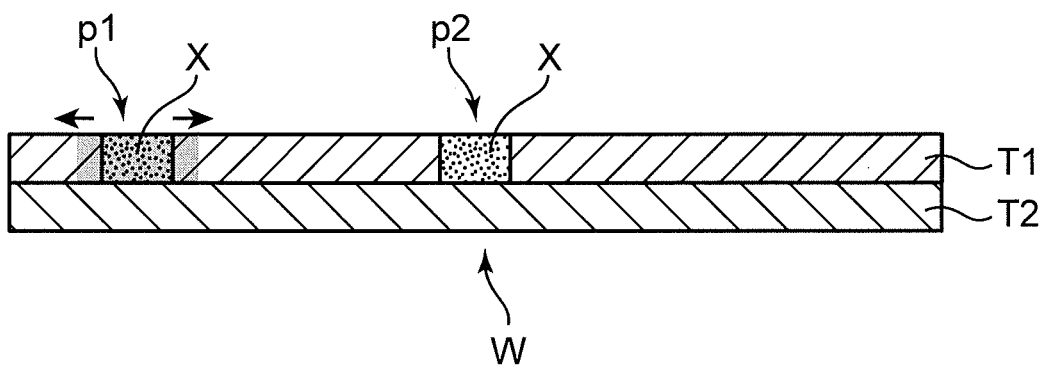
FIG. 10B is a cross-sectional view showing friction stir welding to be executed in a second sequence of preceding welding from the center.
Figure 10C:
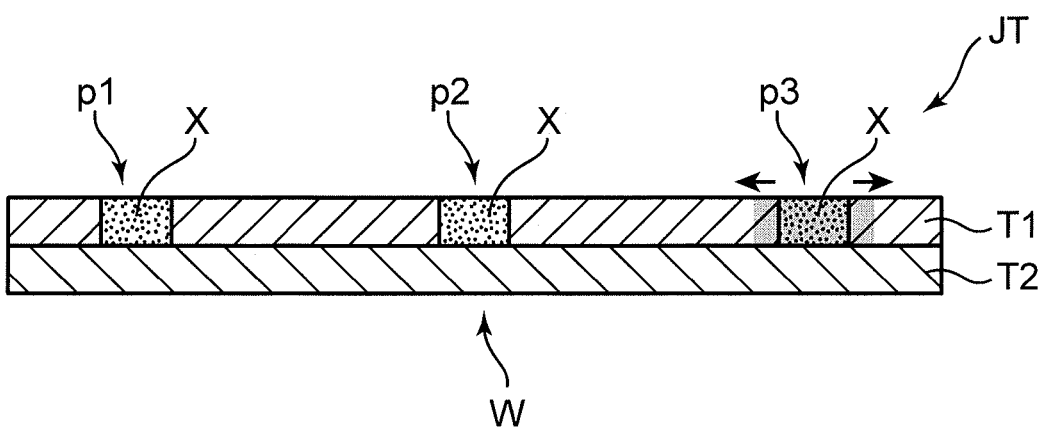
FIG. 10C is a cross-sectional view showing friction stir welding to be executed in a third sequence of preceding welding from the center.

FIGS. 10A to 10C show a case of friction stir welding performed to the overlapping part W of the upper plate T1 and the lower plate T2 shown in FIG. 9A and FIG. 9B precedingly from the center of the overlapping part W. It is noted here that spots located at the overlapping part W are defined as three spots of spots p1 to p3 for simplification. Further, illustration of warpage deformation attributed to the friction stir welding to each of the spots p1 to p3 is omitted. This is applicable to FIG. 11A to FIG. 11C to be described later as well. In each of FIGS. 10A to 10C, a spot at a leftmost position is defined as a left spot p1, a spot at a rightmost position is defined as a right spot p3, and a spot located between the spots p1 and p3 is defined as a center spot p2. In this case, the center spot p2 is firstly welded (FIG. 10A), the left spot p1 is secondly welded (FIG. 10B), and the right spot p3 is thirdly welded (FIG. 10C). When the friction stir welding is performed in this order, the material gradually expands outward in accordance with plunging of the rotary tool 101 into each of the spots p1 to p3. A colored region and arrows given above the region in each of FIGS. 10A to 10C denote the outward expansion of the material. In each of the spots p1 to p3, thermal expansion accompanied by the friction stir and thermal shrinkage accompanied by the subsequent cooling are insuppressible. As a result, repetitive warpage deformation attributed to the thermal shrinkage in the spots p1 to p3 accumulatively causes an inevitable increase in a final warpage quantity of the welded assembly JT.

Figure 11A:
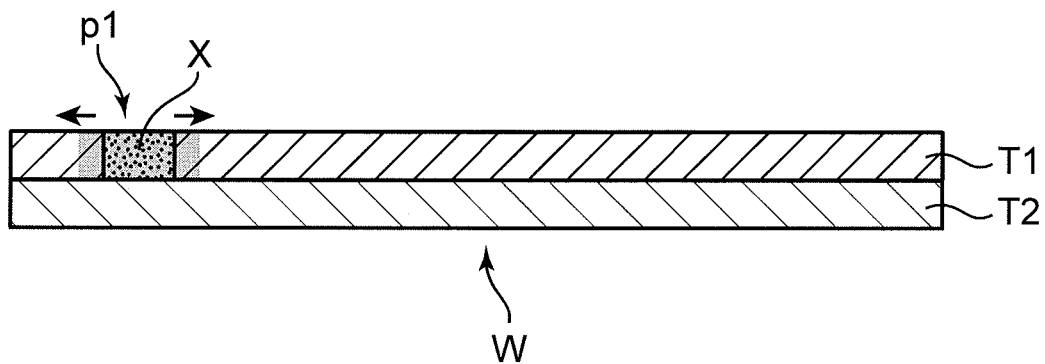
FIG. 11A is cross-sectional a view showing friction stir welding to be executed in a first sequence of preceding welding from the opposite ends.
Figure 11B:
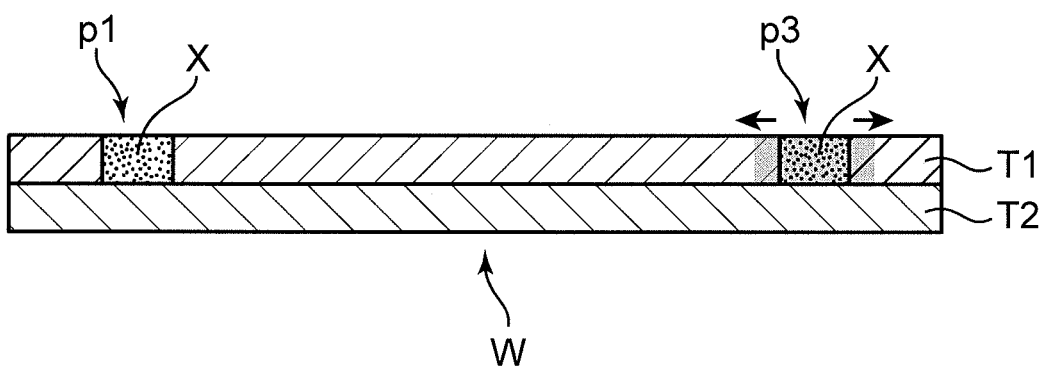
FIG. 11B is a cross-sectional view showing friction stir welding to be executed in a second sequence of preceding welding from the opposite ends.
Figure 11C:
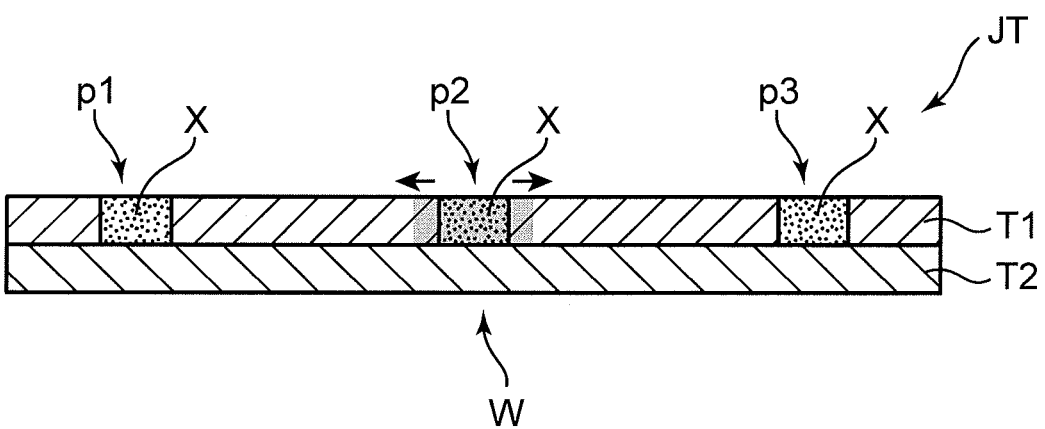
FIG. 11C is a cross-sectional view showing friction stir welding to be executed in a third sequence of preceding welding from the opposite ends.

By contrast, FIGS. 11A to 11C show a case of friction stir welding performed in a reverse order of the case shown in FIGS. 10A to 10C, i.e., show a case of friction stir welding performed precedingly from the opposite ends of the overlapping part W. Specifically, in the case of FIGS. 11A to 11C, the left spot p1 is firstly welded (FIG. 11A), the right spot p3 is secondly welded (FIG. 11B), and the center spot p2 is thirdly welded (FIG. 11C). When the friction stir welding is performed in this order, the material gradually expands outward in the welding of the left and right spots p1, p3, but the outward expansion of the material is deterred in the welding of the center spot p2. This is because solidified friction-stirred parts X are already formed at the left spot p1 and the right spot p3 at the opposite positions at the time of the welding of the center spot p2, and the solidified friction-stirred parts X serve to restrict or block the outward expansion of the material. In other words, the friction-stirred part X precedingly formed at each of the left spot p1 and the right spot p3 serves as a wedge restricting the outward expansion of the material in the welding of the center spot p2 located between the friction-stirred parts. As described above, the case of FIGS. 11A to 11C showing the preceding welding from the opposite ends restricts the thermal expansion in the center spot p2, and thus achieves a decrease in the final warpage quantity of the welded assembly JT.

The case of welding the overlapping part 15 of the first member 11 (upper plate) and the second member 12 (lower plate) by using the method according to the embodiment is similar to the case of FIGS. 11A to 11C described above. Specifically, in the embodiment, for the five spots of the first to fifth spots P1 to P5 at the overlapping part 15, the friction stir welding is precedingly performed to the first spot P1 at the leftmost position and the fifth spot P5 at the rightmost spots, and subsequently performed to the intermediate second to fourth spots P2 to P4. Thus, outward expansion of a material that may occur in welding of the second to fourth spots P2 to P4 is restricted by the friction-stirred part 20 at each of first spot P1 and the fifth spot P5 already existing at the time of the welding. In this manner, in the embodiment, the preceding welding of the first and fifth spots P1 and P5 at the opposite ends restricts thermal expansion in the second to fourth spots P2 to P4, and thus leads to attainment of a decrease in the final warpage quantity of the welded assembly 1.

Further, in the embodiment, execution of the preforming (step S2) of curving each of the first member 11 and the second member 12 into a bow shape protruding upward before friction stir welding of the overlapping part 15 (first to fifth spots P1 to P5) leads to a sufficient reduction in the warpage quantity of the welded assembly 1 in combination with the effect of suppressing the warpage deformation owing to the aforementioned welding order. Specifically, the preforming makes each of the first member 11 and the second member 12 preliminarily curve in a direction opposite to the direction of the warpage deformation attributed to the friction stir welding, i.e., opposite to the direction of the deformation of curving into the bow shape protruding downward. Hence, warpage deformation in the subsequent friction stir welding occurs in a direction of cancelling the curving in the preforming. This leads to decreasing the final warpage quantity of the welded assembly 1 as much as possible, resulting in ensuring the good shape quality of the welded assembly 1.

Figure 12A:
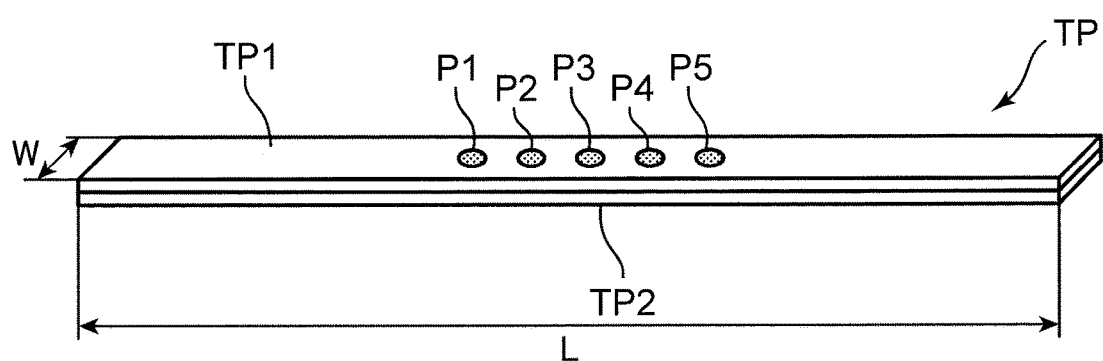
FIG. 12A is a perspective view of a configuration of a specimen for use in a test to confirm an operational effect by the first embodiment.
Figure 12B:
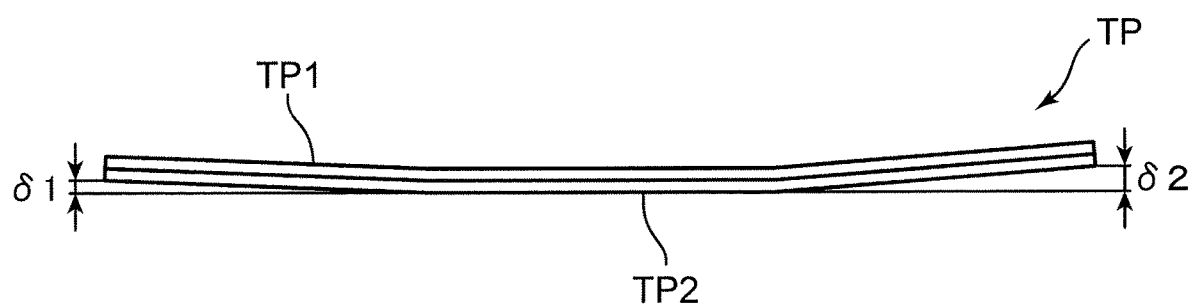
FIG. 12B is a schematic view expressing warpage deformation attributed to friction stir welding to the specimen.

Here, a result of a test conducted to confirm an operational effect of the foregoing welding method according to the embodiment will be described. FIG. 12A is a perspective view of a configuration of a specimen TP used in the test. As shown in the drawing, the specimen TP includes a first member TP1 and a second member TP2 stacked one on another, each member having a planar shape with a length L and a width W. The first member TP1 and the second member TP2 respectively are equivalent to the first member 11 and the second member 12 of the welded assembly 1 in the embodiment (FIG. 1 to FIG. 8). The specimen TP has the length L of 300 mm and the width W of 30 mm. In the test, five spots P1 to P5 were arrayed in a longitudinal direction in a center portion of the specimen TP, and each of the spots was friction-stir welded. A pitch between the adjacent spots was set to 20 mm. The specimen TP was then welded under three conditions of different materials for the first member TP1 and the second member TP2, and a warpage quantity of the specimen TP attributed to the welding was measured under each condition. As shown in FIG. 12B, the warpage quantity here was obtained by averaging values of warpage quantities $\delta 1$, $\delta 2$ measured, by a clearance gauge, at the opposite ends of the specimen TP in the longitudinal direction thereof.

Figure 13:
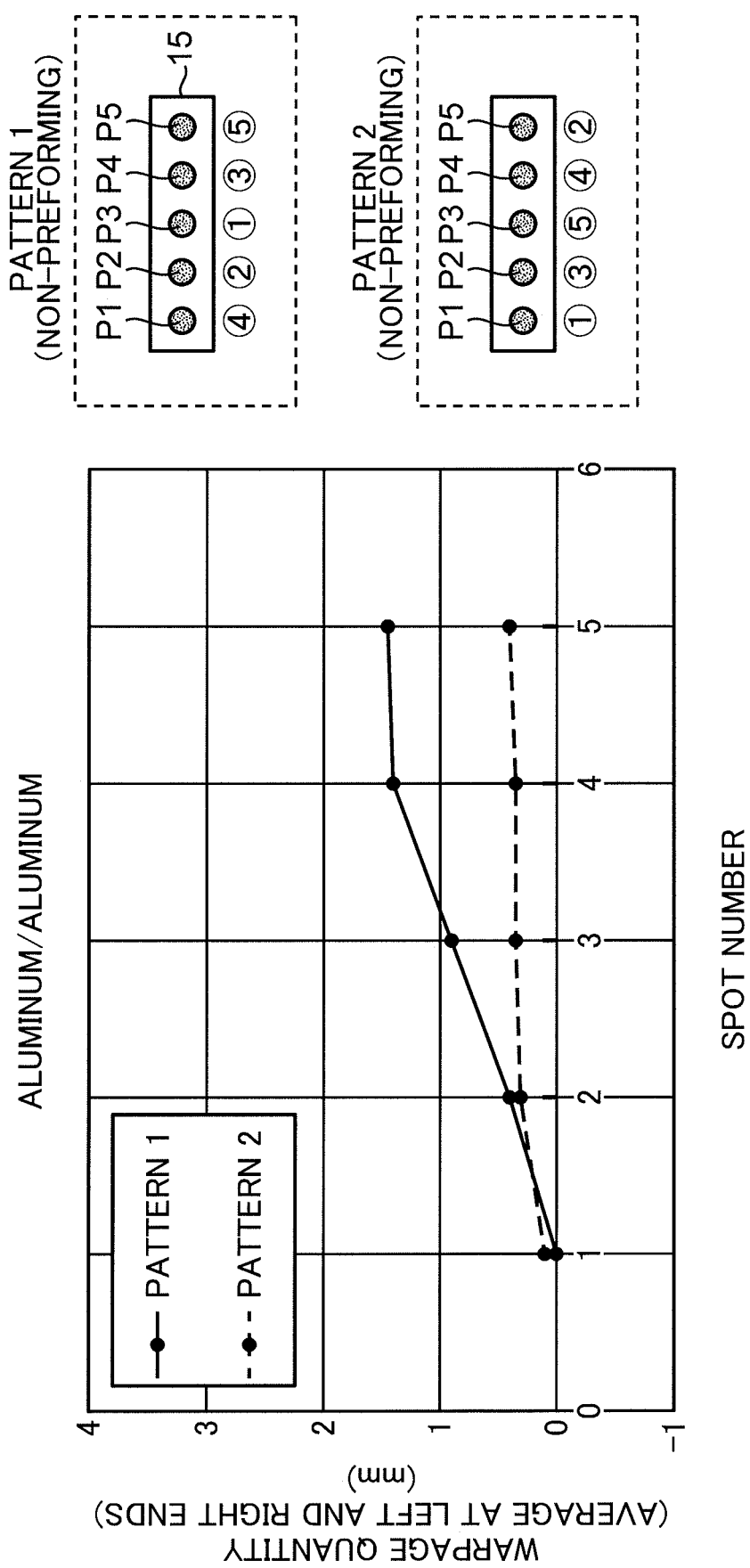
FIG. 13 is a graph showing a result of measurement of a warpage quantity of the specimen in the test.

FIG. 13 is a graph showing a result of measurement of a warpage quantity obtained in use of an aluminum alloy for each of the material of the first member TP1 and the material of the second member TP2. In the graph, the vertical axis indicates a warpage quantity of the specimen TP, i.e., an average of warpage quantities at left and right ends, and a horizontal axis indicates the number of spots subjected to the friction stir welding. In other words, the graph in FIG. 13 shows a relationship between the number of times of the friction stir welding and the warpage quantity of the specimen TP. Pattern 1 in the graph is a welding pattern of performing the friction stir welding outward sequentially from the third spot P3 at the center. Specifically, pattern 1 includes performing the friction stir welding in the order of the third spot P3, the second spot P2, the fourth spot P4, the first spot P1, and the fifth spot P5 to weld the first member TP1 and the second member TP2 to each other. Pattern 2 is a welding pattern of performing the friction stir welding inward sequentially from the first spot P1 and the fifth P5 at the opposite ends. Specifically, pattern 2 includes performing the friction stir welding in the order of the first spot P1, the fifth spot P5, the second spot P2, the fourth spot P4, and the third spot P3 to weld the first member TP1 and the second member TP2 to each other. Pattern 1 and pattern 2 exclude preforming of curving each of the first member TP1 and the second member TP2 into a bow shape protruding upward.

As shown in the graph in FIG. 13, in pattern 1 of performing the friction stir welding sequentially from an inner position to an outer position, the warpage quantity substantially proportionally increases as the number of spots subjected to the friction stir welding increases. By contrast, in pattern 2 of performing the friction stir welding sequentially from an outer position to an inner position in the same manner as the embodiment, the warpage quantity increases until the first and second welding of the first spot P1 and the fifth spot P5, but no outstanding increase in the warpage quantity is seen in the third and subsequent welding, i.e., in the welding of the second to fourth spots P2 to P4. It is seen from these perspectives that a final warpage quantity of the specimen TP, i.e., a warpage quantity of the specimen TP at the fifth welding, increases only by a small quantity from the warpage quantity at the second welding. As a result, the final warpage quantity in pattern 2 is much smaller than the final warpage quantity in pattern 1.

Figure 14:
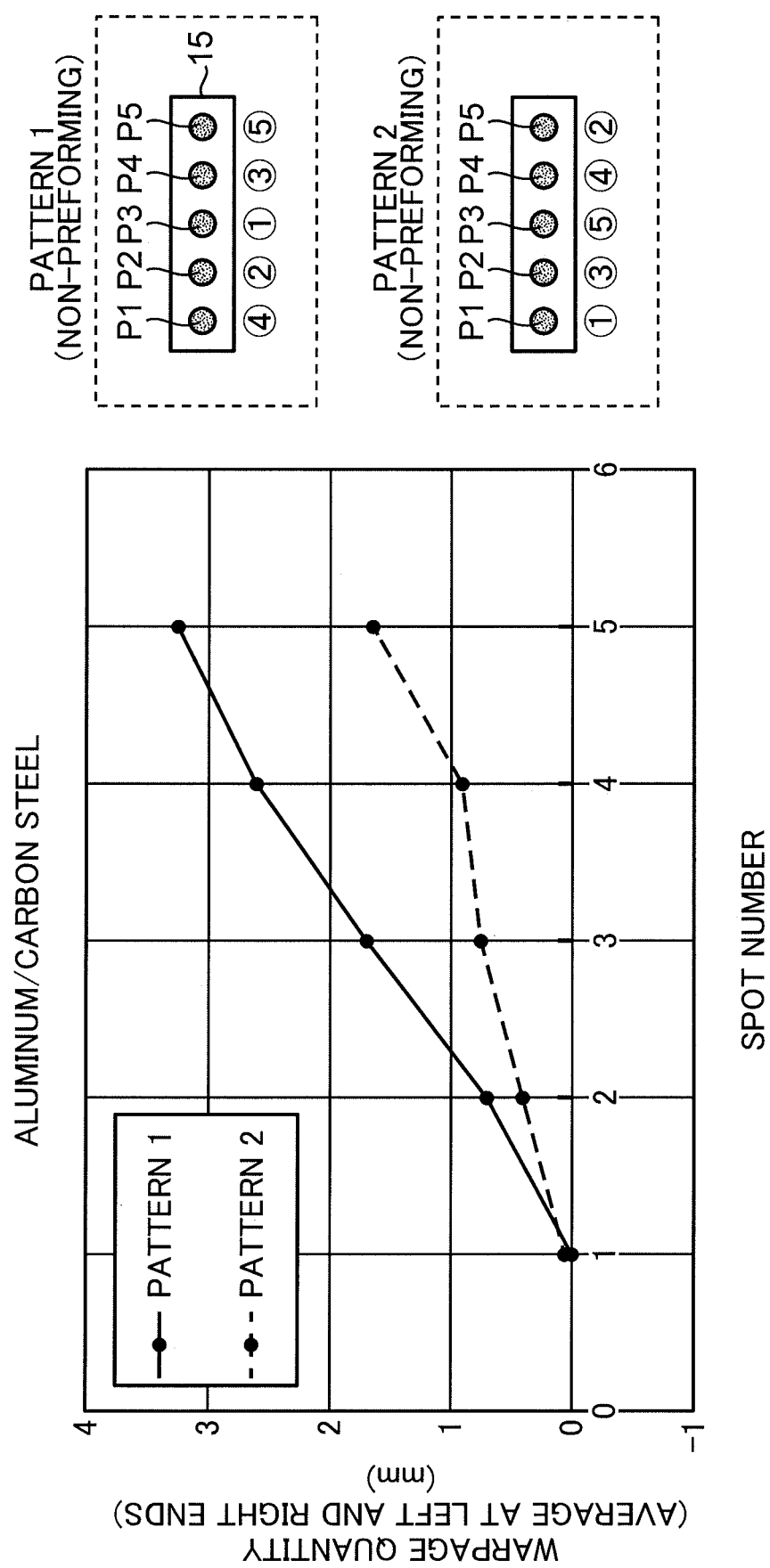
FIG. 14 is a graph showing a result of a test using a material different from that shown in FIG. 13 for the specimen.

FIG. 14 is a graph showing a result of measurement of a warpage quantity obtained in use of an aluminum alloy for the material of the first member TP1 and carbon steel for the material of the second member TP2. In the combination of the materials, a linear expansion coefficient of the first member TP1 is larger than a linear expansion coefficient of the second member TP2. A warpage quantity at the second and subsequent welding increases in both the patterns 1 and 2 in the case of FIG. 14 in comparison with the case of FIG. 13 where the first member TP1 and the second member TP have the same linear expansion coefficient. Further, in the case of FIG. 14, the warpage quantity in pattern 2 of performing welding sequentially from an outer position to an inner position is suppressed to be smaller than the warpage quantity in pattern 1 of performing welding sequentially from an inner position to an outer position, like the case of FIG. 13.

Figure 15:
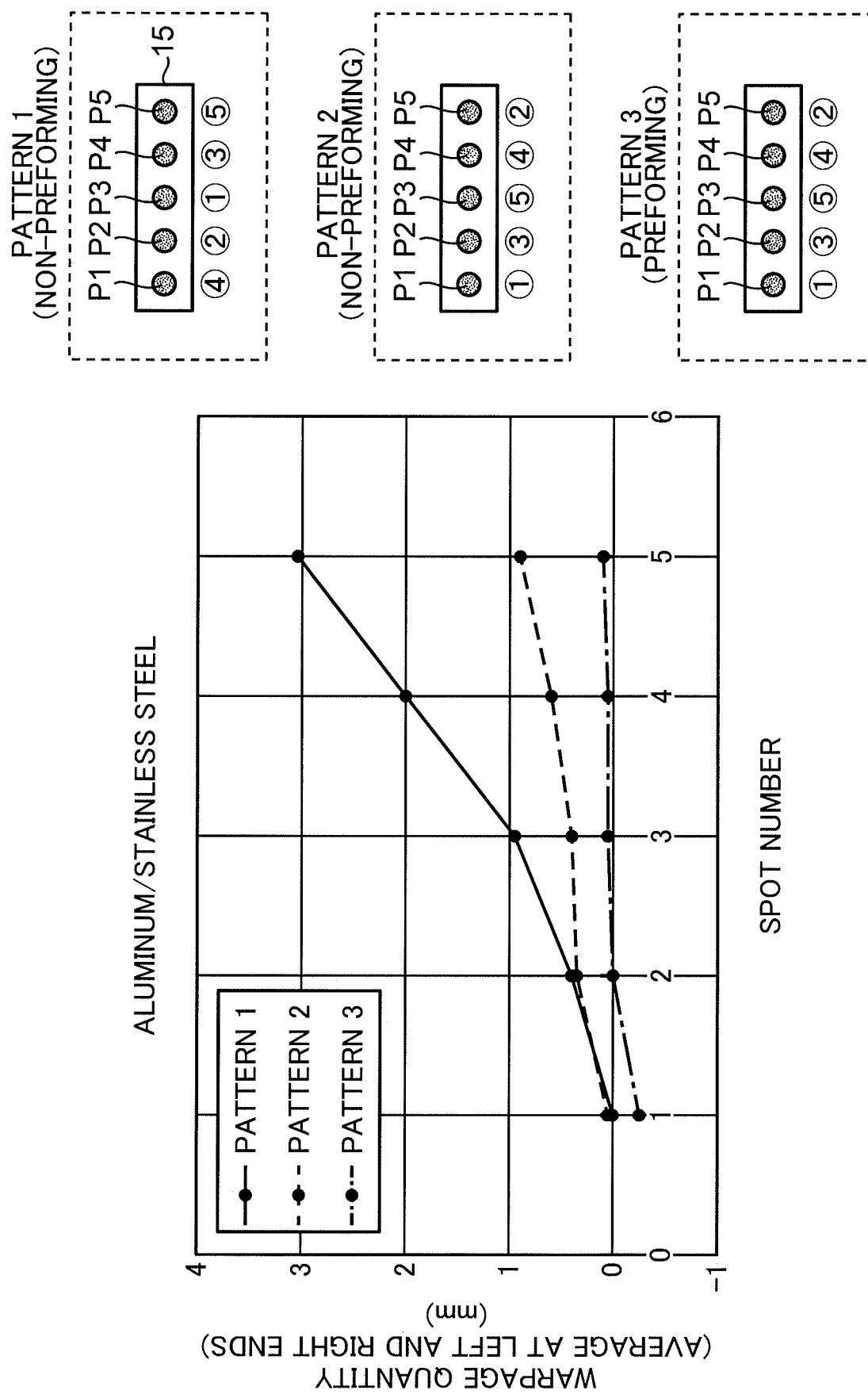
FIG. 15 is a graph showing a result of a test using a material different from that shown each of FIG. 13 and FIG. 14.

FIG. 15 is a graph showing a result of measurement of a warpage quantity obtained in use of an aluminum alloy for the material of the first member TP1 and stainless steel for the material of the second member TP2. FIG. 15 further shows, in addition to patterns 1 and 2 described above, pattern 3 of performing the preforming, and thereafter performing welding sequentially from an outer position to an inner position. Specifically, pattern 3 includes performing the preforming of preliminarily curving each of the first member TP1 and the second member TP2 into a bow shape protruding upward, and thereafter performing the friction stir welding in the order of the first spot P1, the fifth spot P5, the second spot P2, the fourth spot P4, and the third spot P3. In pattern 3, a warpage quantity has a negative value at a zero-spot welding due to the preforming. A linear expansion coefficient of the first member TP1 is larger than a linear expansion coefficient of the second member TP2 in the case of FIG. 15 as well. Thus, at least the final warpage quantity increases in both the pattern 1 and pattern 2 in comparison with the case of FIG. 13 showing the same linear expansion coefficient. By contrast, in pattern 3, the warpage quantity has the negative value initially given in the preforming, and thus, the warpage quantity at each spot welding is suppressed to be much smaller than the warpage quantity in pattern 2. As a result, a final warpage quantity in pattern 3 in FIG. 15 is smaller than the final warpage quantity in pattern 2 in FIG. 13.

The foregoing confirms the effectiveness resulting from the preceding friction stir welding from the first spot P1 and the fifth spot P5, and the effectiveness of performing the preforming of preliminarily curving each of the first member 11 and the second member 12 in an opposite direction like the embodiment.

(2) Second Embodiment

Although the friction stir welding is performed to the first to fifth spots P1 to P5 under the same condition in the first embodiment, a condition of the friction stir welding may be changed depending on a spot. An example for this will be described as a second embodiment.

In the second embodiment, a welding condition for each spot is set so that an input heat amount in welding to a first spot P1 and a fifth welding P5 at the opposite ends is smaller than an input heat amount in welding to second to fourth spots P2 to P4 in intermediate positions. Hereinafter, the first spot P1 and the fifth spot P5 each having a relatively small input heat amount are collectively called opposite-end-spots P1, P5, and the second to fourth spots P2 to P4 each having a relatively large input heat amount are collectively called intermediate spots P2 to P4. The welding order of the spots P1 to P5 in the second embodiment is the same as the welding order in the first embodiment. Specifically, the opposite-end-spots P1, P5 are friction stir-welded precedingly to the intermediate spots P2 to P4 in the second embodiment as well.

Figures 16, 17:
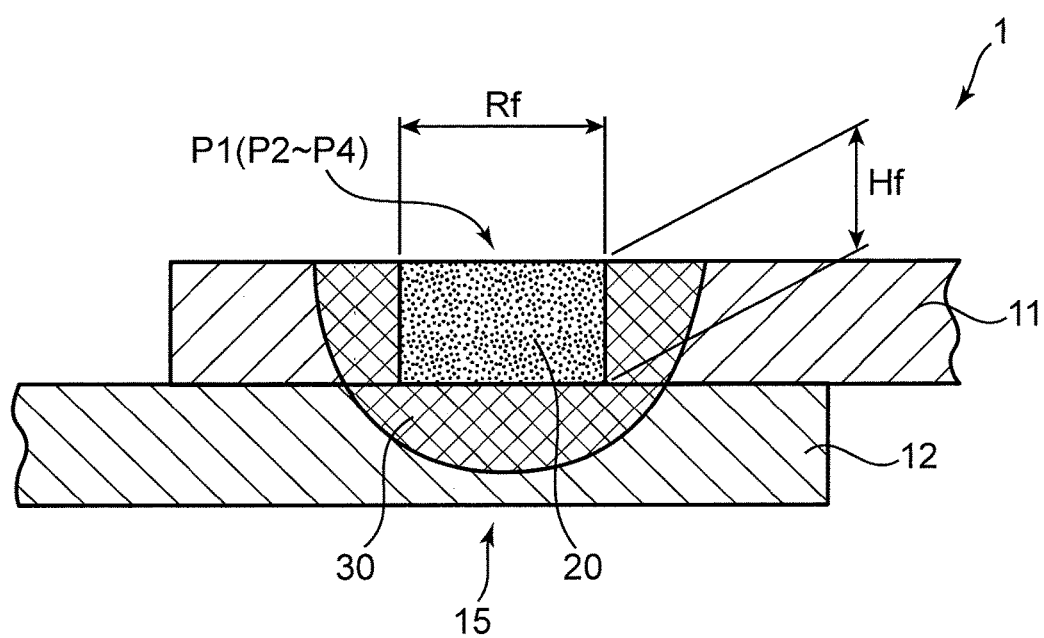
FIG. 16 is a table showing example ways of making an input heat amount to each of the opposite end spots smaller than an input heat amount to an intermediate spot for explanation of a welding method according to a second embodiment of the disclosure.
FIG. 17 is a cross-sectional view for explaining an influence attributed to a difference between input heat amounts described above.

Although various ways of making the input heat amount to the opposite-end-spots P1, P5 relatively small are considered, five ways shown in FIG. 16 are, for example, effective.

A first way is to change a tool diameter being an outer diameter of a rotary tool 101. Specifically, the outer diameter of the rotary tool 101 in the welding of the opposite-end-spots P1, P5 is defined to be smaller than an outer diameter of the rotary tool 101 in the welding of the intermediate spots P2 to P4. When the friction stir welding is performed through the shoulder-preceding process shown in FIG. 8, the tool diameter means an outer diameter of a shoulder member 112 to be plunged in the plunging step S32.

A second way is to change a rotational speed of the rotary tool 101. Specifically, the rotational speed of the rotary tool 101 in plunging into the opposite-end-spots P1, P5 is defined to be lower than the rotational speed of the rotary tool 101 in plunging into the intermediate spots P2 to P4. When the friction stir welding is performed through the shoulder-preceding process shown in FIG. 8, the rotational speed of the rotary tool 101 means a rotational speed of each of a pin member 111 and the shoulder member 112 to be driven to rotate from the plunging step S32 to the leveling step S34.

A third way is to change a pressurizing force of the rotary tool 101. Specifically, an axial pressurizing force of the rotary tool 101 in plunging into the opposite-end-spots P1, P5 is defined to be smaller than an axial pressurizing force of the tool 101 in plunging into the intermediate spots P2 to P4. When the friction stir welding is performed through the shoulder-preceding process shown in FIG. 8, the pressurizing force of the rotary tool 101 means a pressurizing force of the shoulder member 112 to be plunged in the plunging step S32.

A fourth way is to change a welding time period. Specifically, a welding time period for friction stir welding to the opposite-end-spots P1, P5 is defined to be shorter than a welding time period for friction stir-welding to the intermediate spots P2 to P4. The welding time period means a total time period of time periods respectively required for the plunging step S32, the backfill step S33, and the leveling step S34 shown in FIG. 8.

A fifth ways is to change an external cooling amount. For instance, in a case where external cooling of the spots P1 to P5 is performed by, for example, air cooling in combination with the friction stir welding, a capability or cooling amount of the external cooling is changed depending on a spot. Specifically, the external cooling amount to the opposite-end-spots P1, P5 is defined to be larger than the external cooling amount to the intermediate spots P2 to P4.

Any of the first to fifth ways achieves a smaller input heat amount in the friction stir welding of the opposite-end-spot P1, P5 than an input heat amount in the friction stir welding of the intermediate spots P2 to P4. The second embodiment with a difference between input heat amounts attains a further decrease in a warpage quantity of a welded assembly 1.

The opposite-end-spots P1, P5 are welded precedingly to the intermediate spots P2 to P4, and thus, thermal expansion to occur in the opposite-end-spots P1, P5 is unexpected to be restricted by a friction-stirred part 20 at another spot. Specifically, thermal expansion in the intermediate spots P2 to P4 to be welded later in the welding order is restricted by the precedingly welded friction-stirred part 20 at each of the opposite-end-spots P1, P5, but such a restriction effect is unexpectable for the opposite-end-spots P1, P5 to be welded earlier in the welding order. Under the circumstances, greater suppression of the thermal expansion in the opposite-end-spots P1, P5, even little by little, leads to a further decrease in the warpage quantity of the welded assembly 1. The second embodiment makes the input heat amount to the opposite-end-spots P1, P5 smaller than the input heat amount to the intermediate spots P2 to P4. This leads to suppressing the thermal expansion itself in the opposite-end-spots P1, P5, resulting in sufficiently decreasing the warpage quantity of the welded assembly 1.

Here, the smaller input heat amount to the opposite-end-spots P1, P5 than the input heat amount to the intermediate spots P2 to P4 is confirmed from the cross-sectional configuration of the completed welded assembly 1. Hereinafter, an influence on the cross-sectional configuration attributed to the difference between the input heat amounts to the spots will be described.

FIG. 17 is a cross-sectional view for explaining an influence attributed to a difference between input heat amounts described above. A friction stirring diameter Rf shown in the drawing denotes an outer diameter of the friction-stirred part 20, and a dimension agreeing with a tool diameter being an outer diameter of the rotary tool 101. The difference between input heat amounts to the spots can be confirmed from the friction stirring diameter Rf. For instance, confirmation of a smaller friction stirring diameter Rf of each of the opposite-end-spots P1, P5 than the friction stirring diameter Rf of each of the intermediate spots P2 to P4 leads to a proof that the input heat amount to the opposite-end-spots P1, P5 is smaller than the input heat amount to the intermediate spots P2 to P4. It is noted here that this is confirmed under a condition that a friction stirring depth Hf being a depth of a friction-stirred part 20 is the same, the friction stirring depth corresponding to a plunging depth (plunging amount) of the rotary tool 101. When the friction stirring depth Hf is changeable, the input heat amount is measurable from a volume of the friction-stirred part 20 determined by a product of the friction stirring diameter Rf and the friction stirring depth Hf. Specifically, in existence of a spot of a friction-stirred part 20 with a large volume and a spot of a friction-stirred part 20 with a small volume, an input heat amount to the spot of the friction-stirred part 20 with the large volume is larger than an input heat amount to the spot of the friction-stirred part 20 with the small volume.

When each of the first member 11 and the second member 12 is made of metal, a thermally influenced part 30 containing the material with an enlarged grain size can be confirmed around the friction-stirred part 20, as shown in FIG. 17. Specifically, in the thermally influenced part 30, the material heated through heat transfer from the friction-stirred part 20 having a higher temperature attributed to welding has an increased grain size. The grain size in the thermally influenced part 30 increases as the input heat amount is larger. It is understood from this perspective that the input heat amount to each spot is measurable from the grain size in the thermally influenced part 30. For instance, confirmation of a smaller grain size in the thermally influenced part 30 in each of the opposite-end-spots P1, P5 than the grain size in the thermally influenced part 30 in each of the intermediate spots P2 to P4 leads to a proof that the input heat amount to the opposite-end-spots P1, P5 is smaller than the input heat amount to the intermediate spots P2 to P4.

A grain size correlates with the hardness of a material. Specifically, the same metal material has a tendency that the hardness reduces as the grain size increases. Here, the input heat amount is measurable on the basis of the hardness of the material. For instance, confirmation of higher hardness of the thermally influenced part 30 in each of the opposite-end-spots P1, P5 than the hardness of the thermally influenced part 30 in each of the intermediate spots P2 to P4 leads to a proof that the input heat amount to the opposite-end-spots P1, P5 is smaller than the input heat amount to the intermediate spots P2 to P4.

Further, the difference between input heat amounts can be confirmed by a structural change or no structural change in the second member 12 being a lower plate. Specifically, when the second member 12 is made of steel and the second member 12 is heated to exceed a transformation point thereof, a structural change to an austenite structure is seen in the second member 12. By contrast, when the second member 12 is not heated to reach the transformation point, such a structural change is not seen. In this manner, the difference between input heat amounts is determinable on the basis of a structural change or no structural change in the second member 12. For instance, confirmation of a structural change in the second member 12 for the intermediate spots P2 to P4 and no structural change in the second member for the opposite-end-spots P1, P5 leads to a proof that the input heat amount to the opposite-end-spots P1, P5 is smaller than the input heat amount to the intermediate spots P2 to P4. The first member 11 being an upper plate is heated to a temperature at which a plastic flow occurs, and thus inevitably experiences a structural change. In this respect, not the first member 11 but the second member 12 is required to be a target for the determination on the input heat amount attributed to a change or no change in the structure of the member.

(3) Third Embodiment

Although the example of the total number of five spots P1 to P5 arrayed in a row at the overlapping part 15 having the strip shape and including the first member 11 and the second member 12 overlapping each other is described in the first embodiment, the required number of spots at the overlapping part 15 is three or more, and thus, the number is appropriately changeable. Moreover, the friction stir welding may be performed in an order different from the order in the first embodiment depending on the number of spots or the length of the overlapping part 15 in the left-right direction (spot arraying direction). An example for this will be described as a third embodiment.

Figure 18:
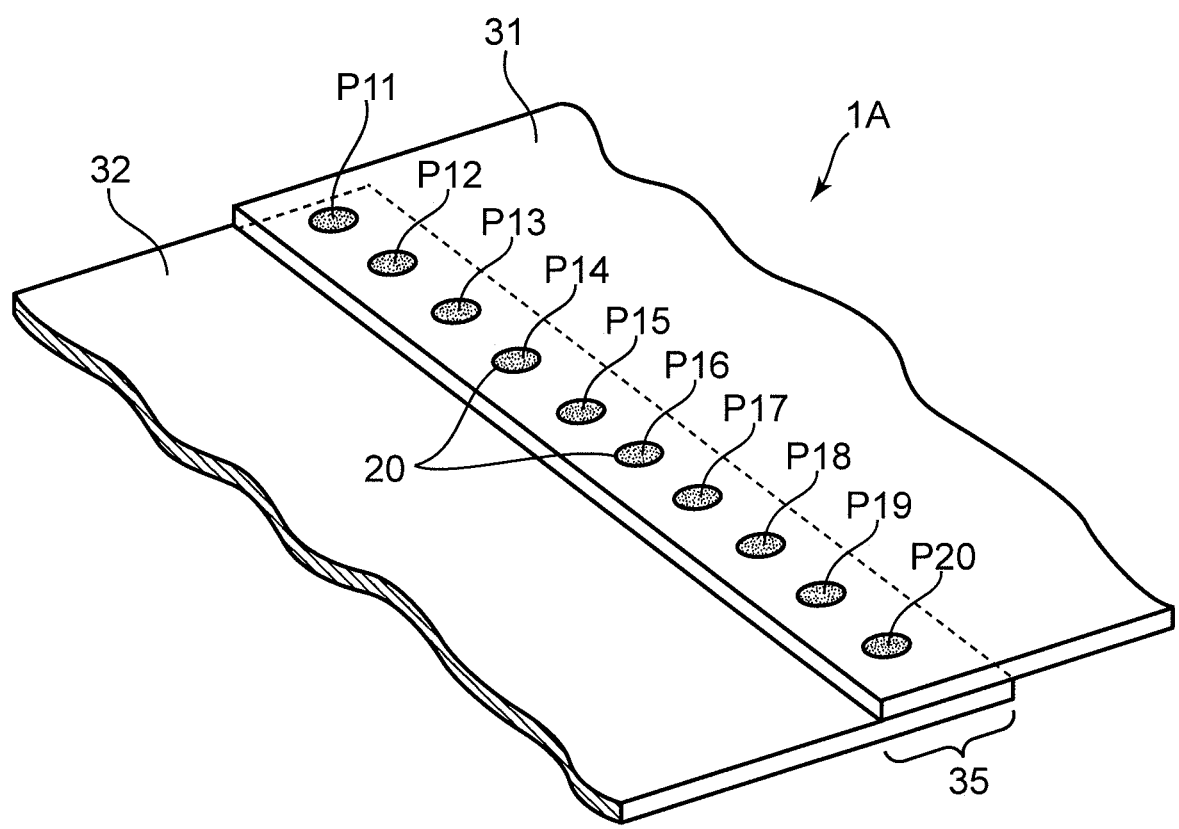
FIG. 18 is a perspective view of a configuration of a welded assembly manufactured by a welding method according to a third embodiment of the present disclosure.

As illustrated in FIG. 18, the third embodiment shows an example where a first member 31 and a second member 32 overlapping each other and each having a relatively large width dimension form an overlapping part 35 which is long in the left-right direction, and a total number often spots P11 to P20 are located at the overlapping part 35. Hereinafter, the spots are defined as a first spot P11, a second spot P12, . . . and a tenth spot P20 sequentially from a left end to a right end of the overlapping part 35. In the third embodiment, the first to tenth spots P11 to P20 are divided into two groups, and the spots in each group is subjected to the friction stir welding in the same order in the first embodiment. This consequently forms a friction-stirred part 20 at each of the spots P11 to P20 to weld the first member 31 and the second member 32 to each other, so that a welded assembly 1A is established.

Figure 19A:
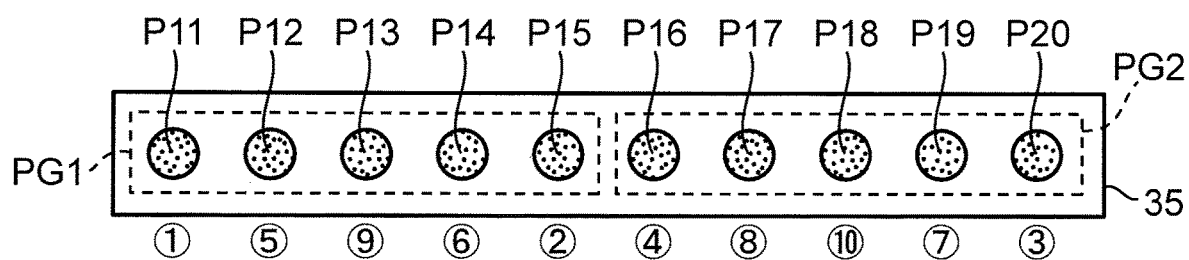
FIG. 19A is a schematic plan view explaining a first sequence pattern for welding each spot for the welded assembly.
Figure 19B:
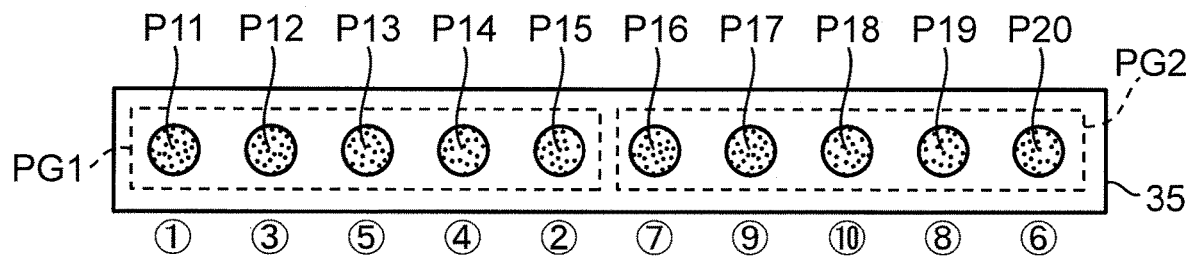
FIG. 19B is a schematic plan view explaining a second sequence pattern for welding each spot for the welded assembly.

Specifically, as shown in FIGS. 19A and 19B, a spot group including the first spot P11 to the fifth spot P15 is defined as a first group PG1, and a spot group including the sixth spot P16 to the tenth spot P20 is defined as a second group PG2. In the third embodiment, a welding order of preferentially welding the spots P11, P15 at the opposite ends is adopted for the five spots from the first to fifth spots P11 to P15 belonging to the first group PG1, and a welding order of preferentially welding the spots P16, P20 at the opposite ends is adopted for the five spots from the sixth to tenth spots P16 to P20 belonging to the second group PG2. In a specific example, as shown in FIG. 19A, the friction stir welding can be performed in the order of the first spot P11, the fifth spot P15, the tenth spot P20, the sixth spot P16, the second spot P12, the fourth spot P14, the ninth spot P19, the seventh spot P17, the third spot P13, and the eighth spot P18. Alternatively, as shown in FIG. 19B, the friction stir welding may be performed in the order of the first spot P11, the fifth spot P15, the second spot P12, the fourth spot P14, the third spot P13, the tenth spot P20, the sixth spot P16, the ninth spot P19, the seventh spot P17, and the eighth spot P18.

Adoption of either of the welding orders shown in FIGS. 19A and 19B results in precedingly welding spots at the opposite ends when the groups PG1, PG2 are individually focused. Specifically, the first spot P11 and the fifth spot P15 at the opposite ends are precedingly welded among the five spots belonging to the first group PG1, and the sixth spot P16 and the tenth spot P20 at the opposite ends are precedingly welded among the five spots belonging to the second group PG2. In the third embodiment, an effect of suppressing warpage deformation which occurs for the same reasons as those in the first embodiment is attained in a left half portion of the overlapping part 15 for the first group PG1 and in a right half portion of the overlapping part 15 for the second group PG2. As a result, the third embodiment also achieves a decrease in a final warpage quantity of the welded assembly 1A.

In the third embodiment, the first spot P1 to be firstly welded in the welding order in the first group PG1 serves as the "one-end-side spot" in the disclosure, and the fifth spot P15 to be subsequently welded in the welding order in the first group PG1 serves as the "other-end-side spot" in the disclosure. Similarly, the tenth spot P20 to be firstly welded in the welding order in the second group PG2 serves as the "one-end-side spot" in the disclosure, and the sixth spot P16 to be subsequently welded in the welding order in the second group PG2 serves as the "other-end-side spot" in the disclosure.

Conclusively, as exemplified in the third embodiment, preceding welding of spots at the opposite ends of the overlapping part 15 is not indispensable depending on the number of spots or the length of the overlapping part 15 in the spot arraying direction. In other words, in the disclosure, it is only required to firstly weld a spot closest to one end of an overlapping part, and a spot closest to the other end of the overlapping part may not be indispensably subsequently welded. A spot to be secondly or subsequently welded may be located somewhat away from the spot closest to the one end and closer to the other end.

(4) Fourth Embodiment

As described above, in the first embodiment, the welding order of precedingly welding the first and fifth spots P1, P5 being the opposite-end-spots for the five spots from the first to fifth spots P1 to P5 at the overlapping part 15 is adopted to restrict outward thermal expansion of a material in welding of the second to fourth spots P2 to P4 each being an intermediate spot, resulting in decreasing a warpage quantity of the welded assembly 1. However, the restriction of thermal expansion in each intermediate spot is limited in the left-right direction being the spot arraying direction, and thermal expansion in the front-rear direction perpendicularly intersecting the left-right direction is not restricted. In this respect, the thermal expansion in the front-rear direction may unexpectedly increase in the intermediate spot. The thermal expansion in the front-rear diction is not directly linked to warpage deformation, but may affect the shape of the overlapping part 15 after the welding. For instance, in FIG. 1 and FIG. 2, the rear end of the first member 11 (upper plate) may deform to have a wavy shape in a plan view as denoted by a long dashed double-dotted line Z in FIG. 2. In the fourth embodiment, an applicable countermeasure for suppressing the wavy deformation will be described.

Figure 20:
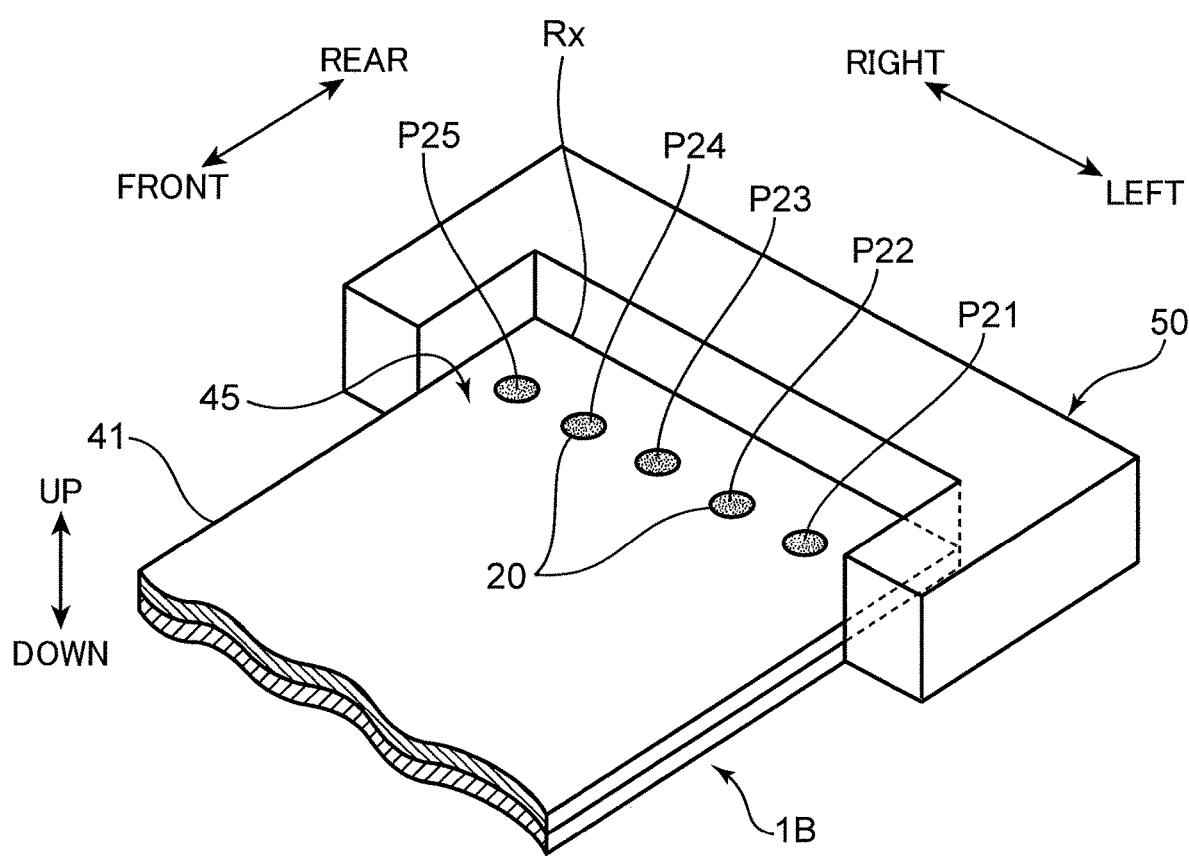
FIG. 20 is a perspective view of a configuration of a welded assembly manufactured by a welding method according to a third embodiment of the present disclosure.
Figure 21:
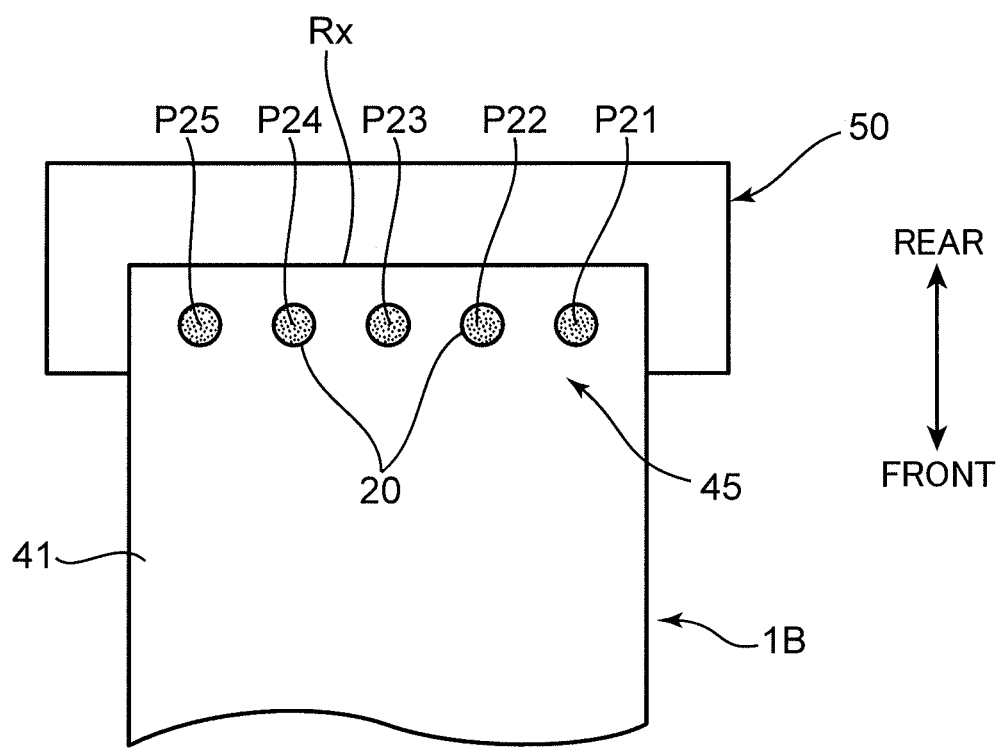
FIG. 21 is a plan view of the welded assembly.

FIG. 20 and FIG. 21 are respectively a perspective view and a plan view for explaining a welding method according to the fourth embodiment. As illustrated in the drawings, in the fourth embodiment, a rear end of a first member 41 and a rear end of a second member 42 overlap each other to form an overlapping part 45, and a rotary tool 101 is plunged into first to fifth spots P21 to P25 located at the overlapping part 45 from the first member 41, i.e., from above, each of the first and second members 41 and 42 having a planer shape with the same width. This consequently forms a friction-stirred part 20 at each of the spots P21 to P25 to weld the first member 41 and the second member 42 to each other, so that a welded assembly 1B is established. The fourth embodiment has characteristics in that friction stir welding is performed to each of the spots P21 to P25 in a state where a jig 50 having a shape extending along the overlapping part 45 is arranged. The jig 50 is a member having a U-shape surrounding the overlapping part 45 from the left, the right, and the rear of the overlapping part in a plan view. The friction stir welding is performed to the spots P21 to P25 in a state where the jig 50 surrounds the overlapping part 45, i.e., in a state where an inner surface of the jig 50 is in close contact with an outer periphery of the overlapping part 45. A welding order of preferentially welding spots at the opposite ends is adopted in the same manner as the first embodiment. Specifically, the first spot P21 and the fifth spot P25 at the opposite ends are precedingly welded, and thereafter, the intermediate second to fourth spots P22 to P24 are welded.

Conclusively, in the fourth embodiment, the friction stir welding is performed to each of the spots P21 to P25 in the state where the jig 50 surrounds the overlapping part 45 of the first member 41 and the second member 42. This achieves suppression of the aforementioned wavy deformation which may occur in welding due to thermal expansion. In other words, wavy deformation on an end side Rx being a rearmost side of the first member 41 (upper plate) after the welding is suppressible. The suppression leads to attainment of improving the shape quality of the welded assembly 1.

Although FIG. 20 and FIG. 21 show the example where the jig 50 surrounds the respective rear ends of the first member 41 and the second member 42 constituting the overlapping part 45, the jig 50 may surround only the rear end of the first member 41. Even this arrangement can suppress waving on the end side Rx of the first member 41.

(5) Other Modifications

Modifications of each embodiment described above will be summarized below. Hereinafter, various modification examples based on the first embodiment will be described, and similar modifications are applicable to other embodiments from the second to fourth embodiments even without any mention thereto.

Although a material of each of the first member 11 and the second member is selected so that a linear expansion coefficient of the first member 11 is equal to or larger than the linear expansion coefficient of the second member 12 (see FIG. 4), the material of each member may be selected so that the linear expansion coefficient of the first member 11 is smaller than the linear expansion coefficient of the second member 12. Specific example combinations of materials for this case include a combination of an aluminum alloy for the material of the first member 11 and a magnesium alloy for the material of the second member 12, a combination of carbon steel for the material of the first member 11 and stainless steel for the material of the second member 12, and a combination of a thermoplastic resin (including a fiber reinforced resin) for the material of the first member 11 and a metal for the material of the second member 12.

Although the overlapping part 15 including the two members of the first member 11 and the second member 12 overlapping each other is friction-stir welded in the first embodiment, one or more additional members may further overlap the first member 11 and the second member 12, and all the members may be welded together. Specifically, the welding method according to the disclosure is applicable to friction stir welding of an overlapping part of at least two members overlapping each other, and further is applicable to friction stir welding of an overlapping part of three or more members overlapping one another.

Although the friction stir welding is performed in the state where the first member 11 and the second member 12 directly overlap each other in the first embodiment, the friction stir welding may be performed in a state where a sealant or an adhesive is applied between the first member 11 and the second member 12. Alternatively, the friction stir welding may be performed in a state where at least one of the first member and the second member is surface treated, such as plated.

Although spots from the first to fifth spots P1 to P5 into which the rotary tool 101 is to be plunged are linearly aligned at the overlapping part 15 of the first member 11 and the second member 12 in the first embodiment, the spots may be arranged in a specific direction as a whole, that is, the spots may be arranged, for example, in a staggered manner in a specific direction.

Although the rotary tool 101 (shoulder member 112) is plunged into the first member 11 by just the thickness of the first member 11 in friction stir welding of the overlapping part 15 of the first member 11 and the second member 12 in the first embodiment, a plunging depth or pressing amount of the rotary tool 101 may be set to a depth at which the friction-stirred part is formed to pass through at least the first member 11, and the rotary tool 101 may be plunged to pass through the first member 11 and reach a certain position in the second member 12.

The configuration in which the rotary tool is plunged until reaching the certain position in the second member has a higher temperature of the second member than a configuration in which the rotary tool does not reach the second member. This reduces a temperature difference between the first member and the second member in welding, and thus is expected to exert an effect of suppressing warpage deformation of a welded assembly. Other adoptable ways of raising the temperature of the second member may include a way of making a backing member with a material having a lower thermal conductivity, e.g., ceramics, and a way of warming the second member by a heater.

Although the example of using the double-acting rotary tool 101 including the pin member 111 and the shoulder member 112 being independently advanceable or retractable and rotatable for the friction stir welding is described in the first embodiment, the welding method according to the disclosure is achievable without limitation to a friction stir welding device including the double acting rotary tool. For instance, a single-acting rotary tool including a pin member being rotatable and advanceable and retractable without a shoulder member may be used to perform the friction stir welding.

(6) Conclusion

The embodiment and the modifications described above cover the disclosure to be described below.

A welding method according to one aspect of this disclosure is a welding method for welding a first member and a second member at an overlapping part of the first member and the second member by plunging a rotary tool into spots located between one end and the other end of the overlapping part to form friction-stirred parts. The welding method includes: a first welding step of forming the friction-stirred part at a one-end-side spot being a spot that is closest to the one end of the overlapping part by plunging the rotary tool into the one end-side spot from the first member; a second welding step of forming the friction-stirred part at an other-end-side spot that is located away from the one-end-side spot and closer to the other end by plunging the rotary tool into the other-end-side spot from the first member after the first welding step; and a third welding step of forming the friction-stirred part at an intermediate spot located between the one-end-side spot and the other-end-side spot by plunging the rotary tool into the intermediate spot from the first member after the second welding step.

The first member into which the rotary tool is plunged is to have a higher temperature than the second member, and hence, thermal expansion of the material thereof in welding and subsequent thermal shrinkage are likely to become relatively large. This induces warpage deformation of the welded assembly including the first member and the second member in combination after the welding. Specifically, the relatively large thermal shrinkage occurring in the first member generates a residual stress of pulling the second member toward the center, and the generated residual stress curves (warps and deforms) the welded assembly into a bow shape protruding in a direction opposite to the rotary tool. In particular, in the disclosure, the spots are arrayed in a row at the overlapping part of the first member and the second member, and the friction stir welding is performed to each of the spots. Thus, repetitive warpage deformation attributed to the friction stir welding to each of the spots may increase a final warpage quantity of an entirety of the welded assembly to an unacceptable level.

However, in the disclosure, the friction stir welding is performed firstly to the one-end-side spot that is closest to the one end of the overlapping part, and the friction stir welding is performed subsequently to the other-end-side spot that is located away from the one-end-side spot and classer to the other end. This leads to suppressing the aforementioned increase in the warpage quantity. In other words, in the disclosure, the friction stir welding is performed to the one-end-side spot and the other-end-side spot precedingly to the friction stir welding to the intermediate spot between the spots. Thus, outward expansion of a material that may occur in welding of the intermediate spot is restricted by the friction-stirred part at each of the one-end-side spot and the other-end-side spot already existing at the time of the welding. In this manner, in the disclosure, the preceding welding of the one-end-side spot and the other-end-side spot restricts the thermal expansion in the intermediate spot, and thus leads to attainment of a decrease in a final warpage quantity of the welded assembly.

The other-end-side spot is typically located closest to the other end of the overlapping part. In this case, the intermediate spot may be defined as a specific one of spots located between the one-end-side spot and the other-end-side spot.

According to this configuration, in a case where four or more spots are provided at the overlapping part, two spots located respectively at the opposite ends are precedingly welded, and the remaining spots located therebetween are welded thereafter. This ensures the effect of suppressing the warpage deformation.

The welding method preferably further includes a preforming step of curving each of the first member and the second member into a bow shape protruding toward the rotary tool before the first welding step.

This configuration leads to a sufficient reduction in the warpage quantity of the welded assembly in combination with the effect of suppressing the warpage deformation owing to the aforementioned welding order. Specifically, the preforming makes each of the first member and the second member preliminarily curve in a direction opposite to the direction of the warpage deformation attributed to the friction stir welding, i.e., opposite to the direction of the deformation of curving into the bow shape protruding in a direction opposite to the rotary tool. Hence, warpage deformation in the subsequent friction stir welding occurs in a direction of cancelling the curving in the preforming. This leads to decreasing the final warpage quantity of the welded assembly as much as possible, resulting in ensuring the good shape quality of the welded assembly.

Preferably, the rotary tool is plunged into each of the spots so that an input heat amount to the one-end-side spot in the first welding step and an input heat amount to the other-end-side spot in the second welding step are smaller than an input heat amount to the intermediate spot in the third welding step.

As described above, thermal expansion in an intermediate spot to be welded later in the welding order is restricted by the precedingly formed friction-stirred part at each of the one-end-side spot and the other-end-side spot, but such a restriction effect is unexpectable for the one-end-side-spot and the other-end-side spot to be welded earlier in the welding order. In this respect, greater suppression of the thermal expansion in the one-end-side-spot and the other-end-side spot, even little by little, leads to a further decrease in the warpage quantity of the welded assembly. The configuration makes the input heat amount to each of the one-end-side spot and the other-end-side spot smaller than the input heat amount to the intermediate spot. This leads to suppressing the thermal expansion itself in each of the one-end-side spot and the other-end-side spot, resulting in sufficiently decreasing the warpage quantity of the welded assembly.

Various ways are considered to make the input heat amount to each of the one-end-side spot and the other-end-side spot smaller. A preferable example is a way of allowing the rotary tool to have a smaller outer diameter. Specifically, the rotary tool preferably has a smaller diameter in the first welding step and the second welding step than in the third welding step.

A material of the first member may have a larger linear expansion coefficient than a material of the second member.

The larger linear expansion coefficient of the first member than the linear expansion coefficient of the second member means that the aforementioned warpage deformation of the welded assembly is more likely to occur. Adoption of the welding method according to the disclosure thus achieves welding of members made of different materials while suppressing the concerned warpage deformation.

A welded assembly according to another aspect of the present disclosure includes: a first member; a second member overlapping the first member; a weld section formed by welding spots located between one end and the other end of an overlapping part of the first member and the second member by friction stir. An input heat amount to a one-end-side spot being a spot that is closest to the one end of the overlapping part and an input heat amount to an other-end-side spot that is located away from the one-end-side spot and closer to the other end are smaller than an input heat amount to an intermediate spot located between the one-end-side spot and the other-end-side spot.

This disclosure attains a welded assembly having a relatively small warpage quantity.

Here, when friction-stirred parts have different outer diameters from each other, input heat amounts also differ from each other. Specifically, a diameter of a friction-stirred part at each of the one-end-side spot and the other-end-side spot is preferably smaller than a diameter of a friction-stirred part at the intermediate spot.

The invention claimed is:

1. A welding method comprising:
creating an overlapping part where a first member and a second member overlap so that a lower surface of the first member is in contact with an upper surface of the second member, the overlapping part including one end and another end;
forming a first friction-stirred part at a one-end-side spot that is a spot that is closest to the one end of the overlapping part by plunging a rotary tool into the one-end-side spot from the first member;
forming a second friction-stirred part at an other-end-side spot that is away from the one-end-side spot and closer to the other end of the overlapping part by plunging the rotary tool into the other-end-side spot from the first member after the first friction-stirred part is formed; and forming a third friction-stirred part at an intermediate spot between the one-end-side spot and the other-end-side spot by plunging the rotary tool into the intermediate spot of the overlapping part from the first member after the second friction-stirred part is formed, wherein the rotary tool is plunged into each of the spots so that an input heat amount to the one-end-side spot and an input heat amount to the other-end-side spot are smaller than an input heat amount to the intermediate spot.

2. The welded method according to claim 1, wherein the other-end-side spot is closest to the other end of the overlapping part, and the intermediate spot is a specific one of spots between the one-end-side spot and the other-end-side spot.

3. The welded method according to claim 1, further comprising curving each of the first member and the second member to be convex toward the rotary tool before forming the first friction-stirred part.

4. The welded method according to claim 1, wherein the rotary tool has a smaller diameter for the first friction-stirred part and the second friction-stirred part than in the third friction-stirred part.

5. The welding method according to claim 1, wherein a material of the first member has a larger linear expansion coefficient than a material of the second member.

* * * * *